US010935432B2

(12) United States Patent
Kotov et al.

(10) Patent No.: US 10,935,432 B2
(45) Date of Patent: Mar. 2, 2021

(54) KIRIGAMI CHIROPTICAL MODULATORS FOR CIRCULAR DICHROISM MEASUREMENTS IN TERAHERTZ AND OTHER PARTS OF ELECTROMAGNETIC SPECTRUM

(71) Applicant: The Regents of The University of Michigan, Ann Arbor, MI (US)

(72) Inventors: Nicholas A. Kotov, Ypsilanti, MI (US);
Theodore B. Norris, Dexter, MI (US);
Gong Cheng, Ann Arbor, MI (US);
Wonjin Choi, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 16/518,230

(22) Filed: Jul. 22, 2019

(65) Prior Publication Data
US 2020/0025618 A1 Jan. 23, 2020

Related U.S. Application Data

(60) Provisional application No. 62/701,245, filed on Jul. 20, 2018.

(51) Int. Cl.
*G01J 5/08* (2006.01)
*G01J 3/42* (2006.01)
(Continued)

(52) U.S. Cl.
CPC .......... *G01J 5/0825* (2013.01); *G01J 3/0224* (2013.01); *G01J 3/2803* (2013.01); *G01J 3/42* (2013.01);
(Continued)

(58) Field of Classification Search
CPC .......... G01J 3/0224; G01J 3/2803; G01J 3/42; G01J 5/0825; G01N 21/19; G01N 21/3581; G02B 5/30
See application file for complete search history.

(56) References Cited

U.S. PATENT DOCUMENTS

| | | | |
|---|---|---|---|
| 2016/0136877 A1* | 5/2016 | Rogers | B29C 61/0616 428/174 |
| 2016/0299270 A1 | 10/2016 | Kotov et al. | |
| 2017/0182723 A1* | 6/2017 | Calisch | B64C 3/20 |

FOREIGN PATENT DOCUMENTS

WO 2019139656 A1 7/2019

OTHER PUBLICATIONS

Warnke, Ingolf et al., "Circular dichroism: electronic," WIREs Comput Mol Sci 2012, 2: pp. 150-166; DOI: 10.1002/wcms.55 (Published Jul. 5, 2011).

* cited by examiner

*Primary Examiner* — Mark R Gaworecki
(74) *Attorney, Agent, or Firm* — Harness, Dickey & Pierce, P.L.C.

(57) ABSTRACT

Kirigami-based optic devices are provided that include a tunable kirigami-based component comprising a plurality of bridge structures and a plurality of openings therebetween to form a grating structure. At least one surface of the kirigami-based component is micropatterned with a plasmonic material so that the grating is configured to induce or modulate rotational polarity of a beam of electromagnetic radiation as it passes through the plurality of openings. In certain aspects, the micropattern may be a gold herringbone pattern. The kirigami-based component has tunable 3D topography, which when stretched, exhibits polarization rotation angles as high as 80° and ellipticity angles as high as 34° due to the topological equivalency of helix. The kirigami-based com- (Continued)

ponents are compact electromagnetic modulators and can be used in THz circular dichroism (TCD) spectroscopy, for example, in a stacked configuration as a modulator, as an encryptor/decryptor for secure communication, in biomedical imaging, and LIDAR systems.

20 Claims, 16 Drawing Sheets
(14 of 16 Drawing Sheet(s) Filed in Color)

(51) Int. Cl.
  *G01J 3/28* (2006.01)
  *G01J 3/02* (2006.01)
  *G01N 21/35* (2014.01)
  *G02B 5/30* (2006.01)
  *G01N 21/3581* (2014.01)
  *G01N 21/19* (2006.01)
(52) U.S. Cl.
  CPC ........... *G01N 21/3581* (2013.01); *G02B 5/30* (2013.01); *G01N 21/19* (2013.01)

KIRIGAMI CHIROPTICAL MODULATORS FOR CIRCULAR DICHROISM MEASUREMENTS IN TERAHERTZ AND OTHER PARTS OF ELECTROMAGNETIC SPECTRUM

CROSS-REFERENCE TO RELATED APPLICATIONS

This application claims the benefit of U.S. Provisional Application No. 62/701,245 filed on Jul. 20, 2018. The entire disclosure of the above application is incorporated herein by reference.

GOVERNMENT SUPPORT

This invention was made with government support under HR00111720067 awarded by the Defense Advanced Research Projects Agency. The Government has certain rights in the invention.

FIELD

The present disclosure relates to kirigami-based optic devices, for example, kirigami-based chiroptical devices and/or modulators, including a kirigami-based grating component configured to induce or modulate rotational polarity or other characteristics of a beam of electromagnetic radiation as it passes through a plurality of openings formed via kirigami techniques.

BACKGROUND

This section provides background information related to the present disclosure which is not necessarily prior art.

Chiroptical spectroscopies afford probing of chirality of matter at molecular and nanometer scales. Generally, "chiroptical" refers to an optical technique (such as refraction, absorption, and/or emission of electromagnetic radiation) for investigating chiral substances. This can include measuring optical rotation at a fixed wavelength, optical rotatory dispersion (ORD), circular dichroism (CD), and circular polarization of luminescence (CPL). Circular dichroism (CD) is a difference in absorbance of left circularly polarized (LCP) and right circularly polarized (RCP) electromagnetic waves/light. Electronic circular dichroism (ECD) spectroscopy is one common type of CD, which probes electronic transitions using visible or ultraviolet light. ECD can thus serve as a research tool based on the modulation of circularly polarized UV-VIS photons with wavelengths from 200 nm to 800 nm and energies from 7 eV to 1.5 eV. ECD has been an important tool for the study of chiral materials, for example, the chirality of electronic transitions in small molecules. Its widespread adoption has led to emergence of chiral liquid crystals, enantioselective drugs, de novo protein folding, and some information technologies, among others.

A similar chiroptical spectroscopy known as vibrational circular dichroism (VCD) is based on the modulation of circularly polarized photons with the wavelengths from 2,500 nm to 16,000 nm and energies from 0.5 eV to 0.07 eV in the mid-infrared (MIR) electromagnetic region. ECD and VCD are based on the modulation of circularly polarized light with photons in these energy ranges, which limits the physical dimensions and the resonant energies of the chiral structures that can be probed. Thus, the spectral characteristics of these photons limit the physical dimensions and the resonant energy of the chiral structures in materials and molecules that can be probed.

Of particular interest is the far infrared (IR) part of the electromagnetic spectrum, known as terahertz (THz) diapason, which has photon wavelengths from about 0.1 mm to about 1 mm and energies from about 0.001 eV to about 0.01 eV. Besides being informative for many areas of THz studies from astronomy and solid-state physics to telecommunication, THz circular dichroism (TCD) is important for understanding biomaterials, biomolecules, and pharmaceuticals, because the energy of THz photons enables probing the "soft" oscillatory motions of biomolecules. However, the practical realization has proven to be an elusive goal due to the difficulties with polarization modulation of THz radiation. One problem is the lack of optical components for modulation of circular polarization in the THz regime, which can be easily accomplished at shorter wavelengths using piezoelectric photoelastic modulators (PEM), half- and quarter waveplates, and chiral metamaterials and metasurfaces. Although the modulation of linearly and circularly polarized THz beams has been demonstrated with fairly complicated and bulky optical systems based on THz metamaterials, e.g. with pneumatic control of scattering elements sufficiently strong and dynamic polarization rotation of THz radiation remains a significant challenge. Sufficiently strong and rapid polarization rotation of THz photons has remained a challenge, especially with less complex optical systems.

SUMMARY

This section provides a general summary of the disclosure, and is not a comprehensive disclosure of its full scope or all of its features.

In various aspects, the present disclosure provides a kirigami-based optic device. The device comprises a tunable kirigami-based component that includes a plurality of bridge structures and a plurality of openings therebetween. At least one surface of the tunable kirigami-based component has a micropattern comprising a plasmonic material. Thus, the tunable kirigami-based component is configured to induce or modulate rotational polarity of a beam of electromagnetic radiation as it passes through the plurality of openings.

In one aspect, the plasmonic material is selected from the group consisting of gold (Au), alloys of gold (Au), silver (Ag), alloys of silver (Ag), copper (Cu), alloys of copper (Cu), aluminum (Al) and alloys of aluminum (Al), cadmium tellurium (CdTe), indium tin oxide (ITO), tungsten trioxide ($WO_3$), molybdenum trioxide ($MoO_3$), graphene, carbon dots, carbon ribbons, and combinations thereof.

In one aspect, the plasmonic material comprises gold.

In one aspect, the tunable kirigami-based component exhibits a polarization rotation angle ($\theta$) of greater than or equal to about 75°.

In one aspect, the tunable kirigami-based component exhibits a polarization rotation angle ($\theta$) of greater than or equal to about 75° after greater than or equal to about 10,000 cycles of stretching and relaxation.

In one aspect, the tunable kirigami-based component exhibits an elliptical angle ($\eta$) of polarization of greater than or equal to about 30°.

In one aspect, the beam of electromagnetic radiation is in a terahertz (THz) range having a photon wavelength of from about 0.1 mm to about 1 mm and energy of from about 0.001 eV to about 0.01 eV.

In one aspect, the plurality of openings are defined by a first row of at least two discontinuous cuts extending from a first surface to an opposite second surface of the component and a second row of at least two discontinuous cuts extending from the first surface to the opposite second surface of the tunable kirigami-based component, wherein the first row and the second row cooperate to form a plurality of bridge structures that create an array of alternating convex and concave out-of-plane elements.

In one aspect, the micropattern comprises a plurality of stripes of the plasmonic material, where in a portion of the plurality of stripes are spaced apart from one another and are substantially parallel to one another.

In one aspect, the plurality of stripes has an average width of greater than or equal to about 1 μm to less than or equal to about 10 μm and an average space between respective stripes is greater than or equal to about 5 μm to less than or equal to about 15 μm.

In one aspect, the micropattern comprises a plurality of stripes of the plasmonic material that defines a herringbone pattern.

In one aspect, the plurality of openings are defined by a first row of at least two discontinuous cuts and the micropattern comprises a plurality of stripes defining an inclination angle ($\varphi$) with respect to the first row of greater than or equal to about 15° to less than or equal to about 45°.

In yet other variations, the present disclosure provides a tunable optic device. The tunable optic device comprises a tunable kirigami-based grating capable of transmitting and inducing or modulating rotational polarity of a beam of electromagnetic radiation. The tunable kirigami-based grating comprises a plurality of bridge structures and a plurality of openings therebetween. Further, at least one surface of the tunable kirigami-based grating has a micropattern comprising a plasmonic material. Thus, the tunable kirigami-based grating is configured to induce or modulate rotational polarity of a beam of electromagnetic radiation as it passes through the plurality of openings. The tunable optic device also includes a tensioning component attached to the tunable kirigami-based grating that reversibly stretches the tunable kirigami-based grating in at least one direction. In this manner, the beam of electromagnetic radiation is modified as it is transmitted through the plurality of openings in the tunable kirigami-based grating.

In one aspect, the beam of electromagnetic radiation is in a terahertz (THz) range having a photon wavelength of from about 0.1 mm to about 1 mm and energy of from about 0.001 eV to about 0.01 eV.

In one aspect, the tunable optic device is a THz circular dichroism (TCD) spectroscopy device having a region to hold a sample to be analyzed disposed between the tunable kirigami-based grating and a detector.

In one aspect, the tunable kirigami-based grating is a first tunable kirigami-based grating and the tunable optic device further comprises a second tunable kirigami-based grating independently capable of being reversibly stretched.

In one aspect, the tunable optic device further comprises a source of electromagnetic radiation directed at the tunable kirigami-based grating and a detector downstream of the tunable kirigami-based grating.

In one aspect, the plasmonic material is selected from the group consisting of gold (Au), alloys of gold (Au), silver (Ag), alloys of silver (Ag), copper (Cu), alloys of copper (Cu), aluminum (Al) and alloys of aluminum (Al), cadmium tellurium (CdTe), indium tin oxide (ITO), tungsten trioxide ($WO_3$), molybdenum trioxide ($MoO_3$), graphene, carbon dots, carbon ribbons, and combinations thereof.

In one aspect, the tunable kirigami-based grating exhibits a polarization rotation angle (θ) of greater than or equal to about 75° after greater than or equal to about 10,000 cycles of stretching and relaxation.

In one aspect, the tunable kirigami-based grating exhibits an elliptical angle (η) of polarization of greater than or equal to about 30°.

Further areas of applicability will become apparent from the description provided herein. The description and specific examples in this summary are intended for purposes of illustration only and are not intended to limit the scope of the present disclosure.

DRAWINGS

The patent or application file contains at least one drawing executed in color. Copies of this patent or patent application publication with color drawing(s) will be provided by the Office upon request and payment of the necessary fee.

The drawings described herein are for illustrative purposes only of selected embodiments and not all possible implementations, and are not intended to limit the scope of the present disclosure.

Figures 3A, 3B, 3C:
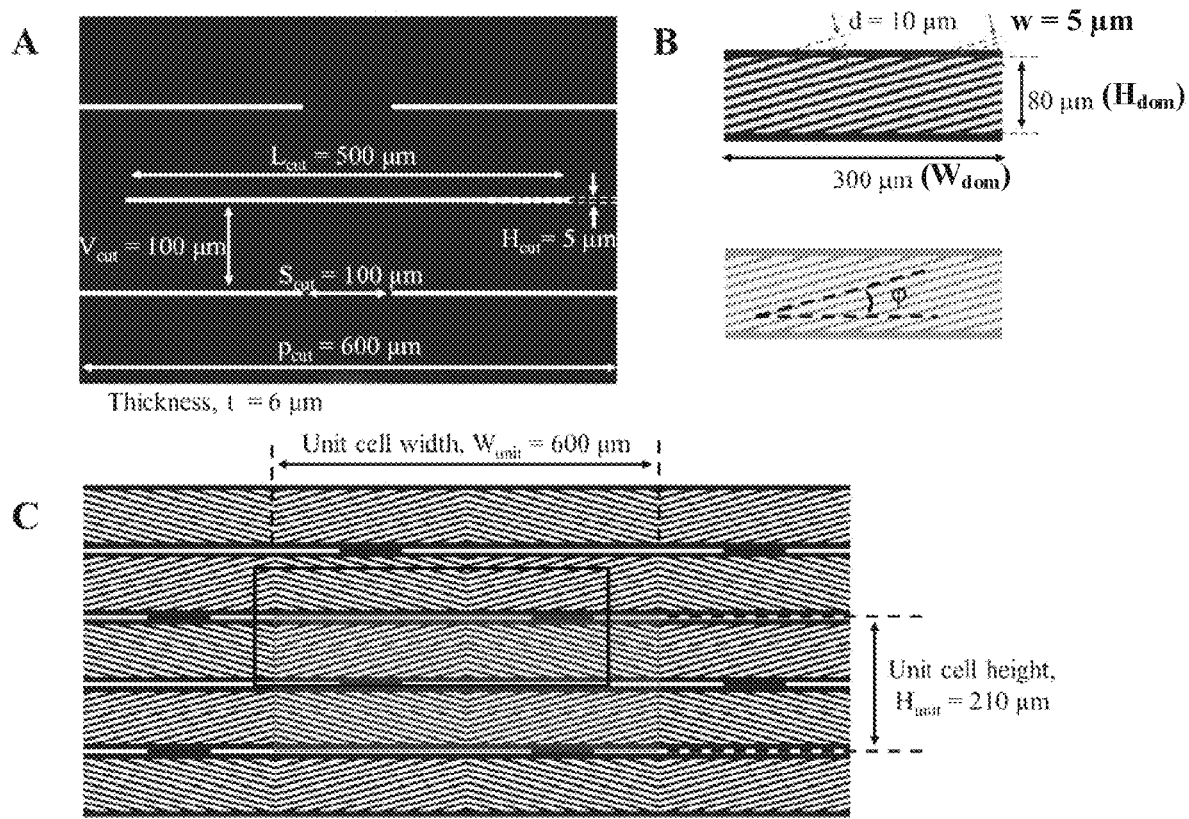

FIGS. 3A-3C show a detailed view of one embodiment of a pattern of microstripes of plasmonic metallic material in accordance with certain aspects of the present disclosure. FIG. 3A shows a top view of kirigami cut pattern in the sheet. FIG. 3B shows a detailed view of a single unit of slanted metallic stripes. FIG. 3C shows a top view image of aligned kirigami cut pattern and a herringbone pattern formed from a metallic material (e.g., Au). The box indicates a unit cell of such a double pattern.

Figures 4A, 4B, 4C:
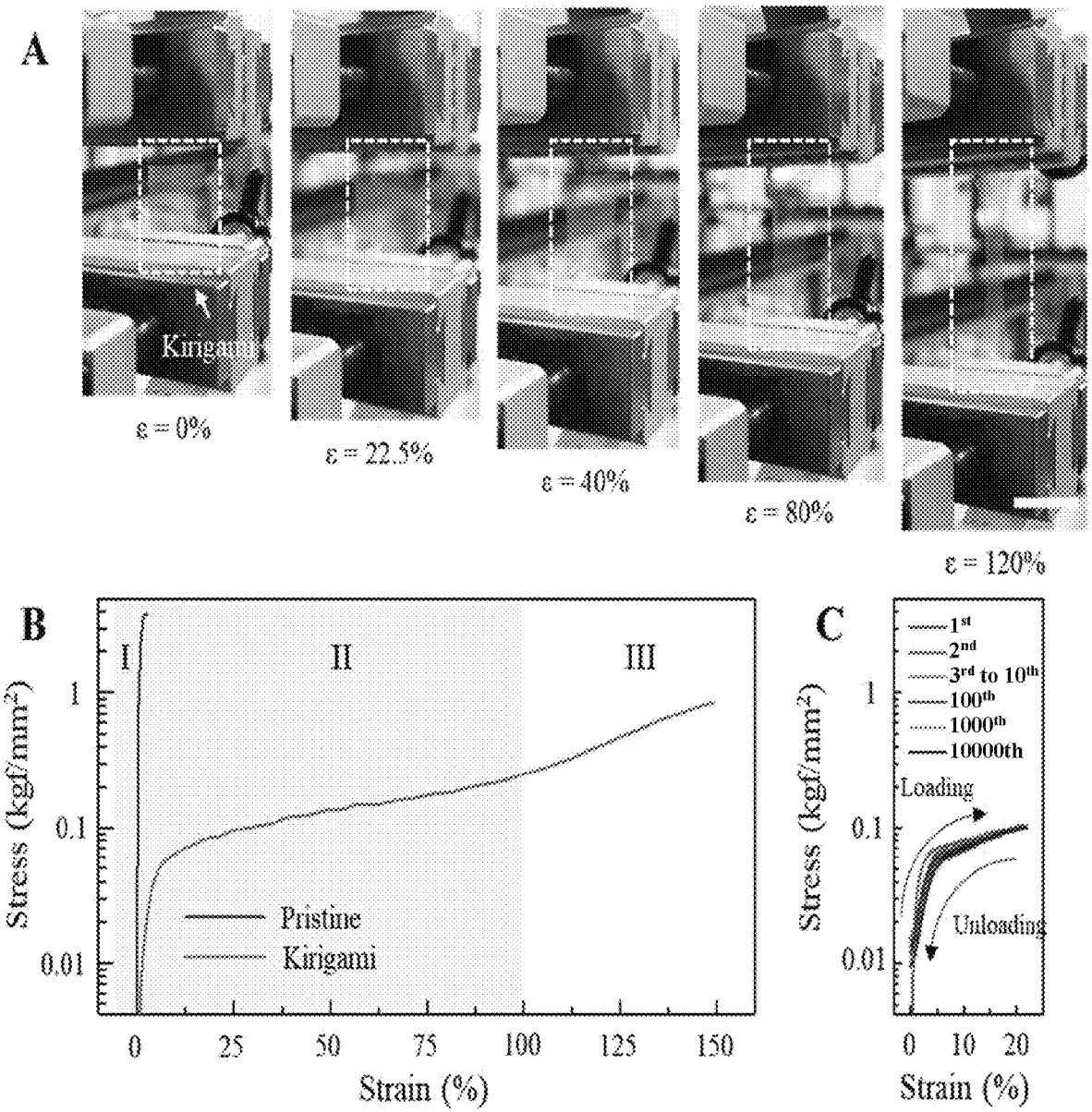

FIGS. 4A-4C shows stretching and cycling properties of a kirigami-based modulator optic device formed in accordance with certain aspects of the present disclosure. FIG. 4A shows photo images of the kirigami-based component at strain values of 0%, 22.5%, 40%, 80% and 120% (from left to right). The scale bar in FIG. 4A is 2 cm. FIGS. 4B and 4C show stress-strain curves and cycling properties of a chiral kirigami modulator optic device. Sections I, II, and III indicate the regions of in-plane elastic deformation, out-of-plane elastic deformation and plastic deformation with pattern collapse, respectively.

Figures 5A, 5B, 5C, 5D:
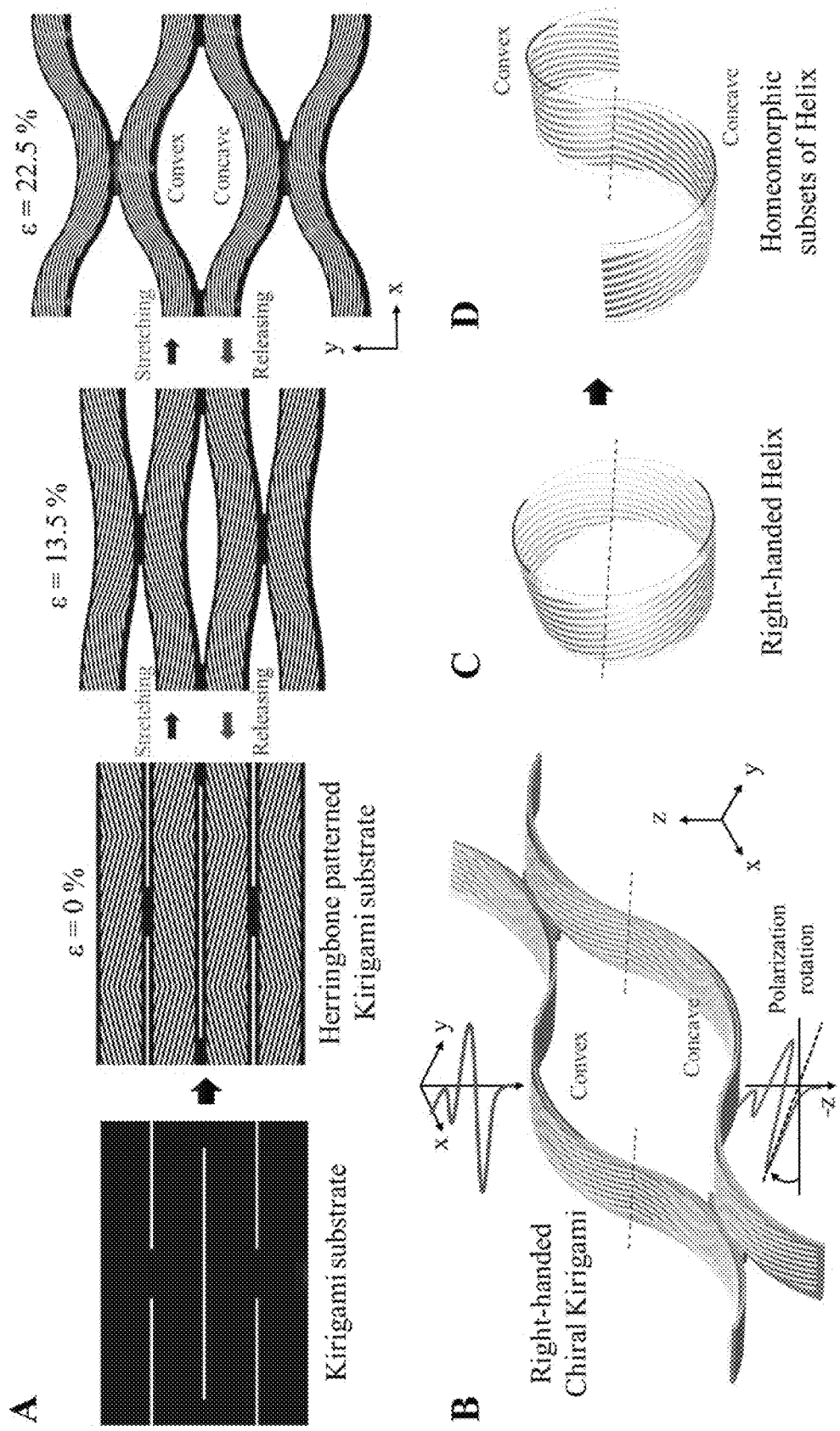

FIGS. 5A-5D show a chiral kirigami topology. FIG. 5A shows a herringbone pattern of a plasmonic metallic material (e.g., gold (Au) stripes) deposited on a kirigami-cut substrate. This chiral kirigami-based topology can tune the polarization rotation angle and ellipticity by mechanical force. FIG. 5A shows strain (ε) at 0%, 13.5%, and 22.5%. FIG. 5B shows a stretched chiral kirigami metamaterial that is topologically equivalent to a helix structure. FIG. 5C shows a standard right-handed helix structure, where an outside surface is covered with slanted striations and the structure has homeomorphic subsets of a helix. FIG. 5D shows homeomorphic subsets of a helix.

Figures 6A, 6B, 6C, 6D, 6E, 6F, 6G, 6H:
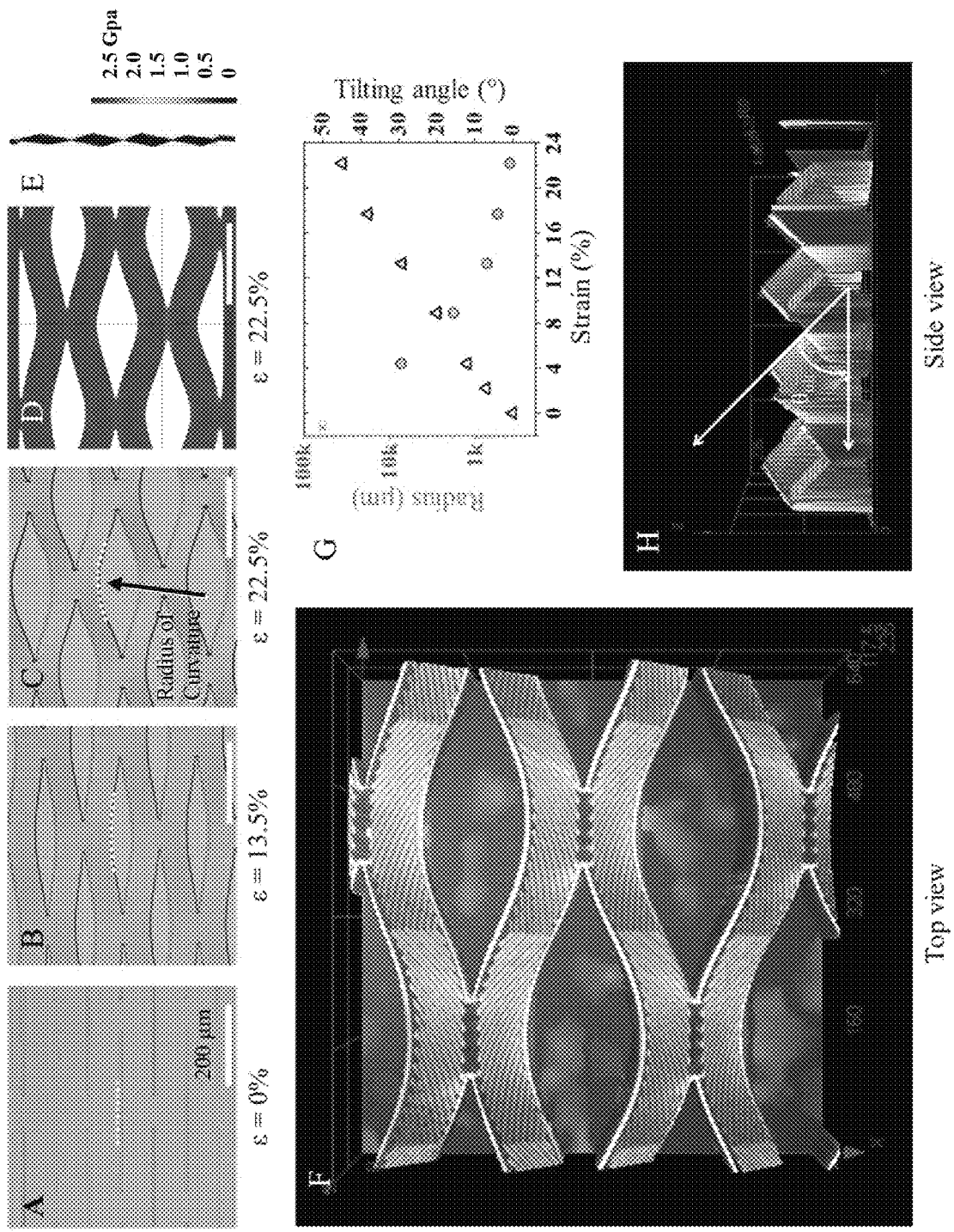

FIGS. 6A-6H show a structural evolution of a kirigami modulator subjected to tensile stress. FIGS. 6A-6C show optical microscope images of kirigami cut parylene sheets at strain values of 0% (FIG. 6A), 13.5% (FIG. 6B) and 22.5%

(FIG. 6C), respectively. FIGS. 6D and 6E show a top view (FIG. 6D) and side view (FIG. 6E) of stress distribution visualization in finite element method (FEM) at a strain ($\varepsilon$) level of 22.5%. FIGS. 6F and 6H show a top view (FIG. 6F) and side view (FIG. 6H) of a kirigami-based component at $\varepsilon$=22.5% strain captured by laser confocal microscopy. FIG. 6G shows a radius of the cut/opening and tilting angle of the kirigami domain with respect to the strain (%).

Figure 7:
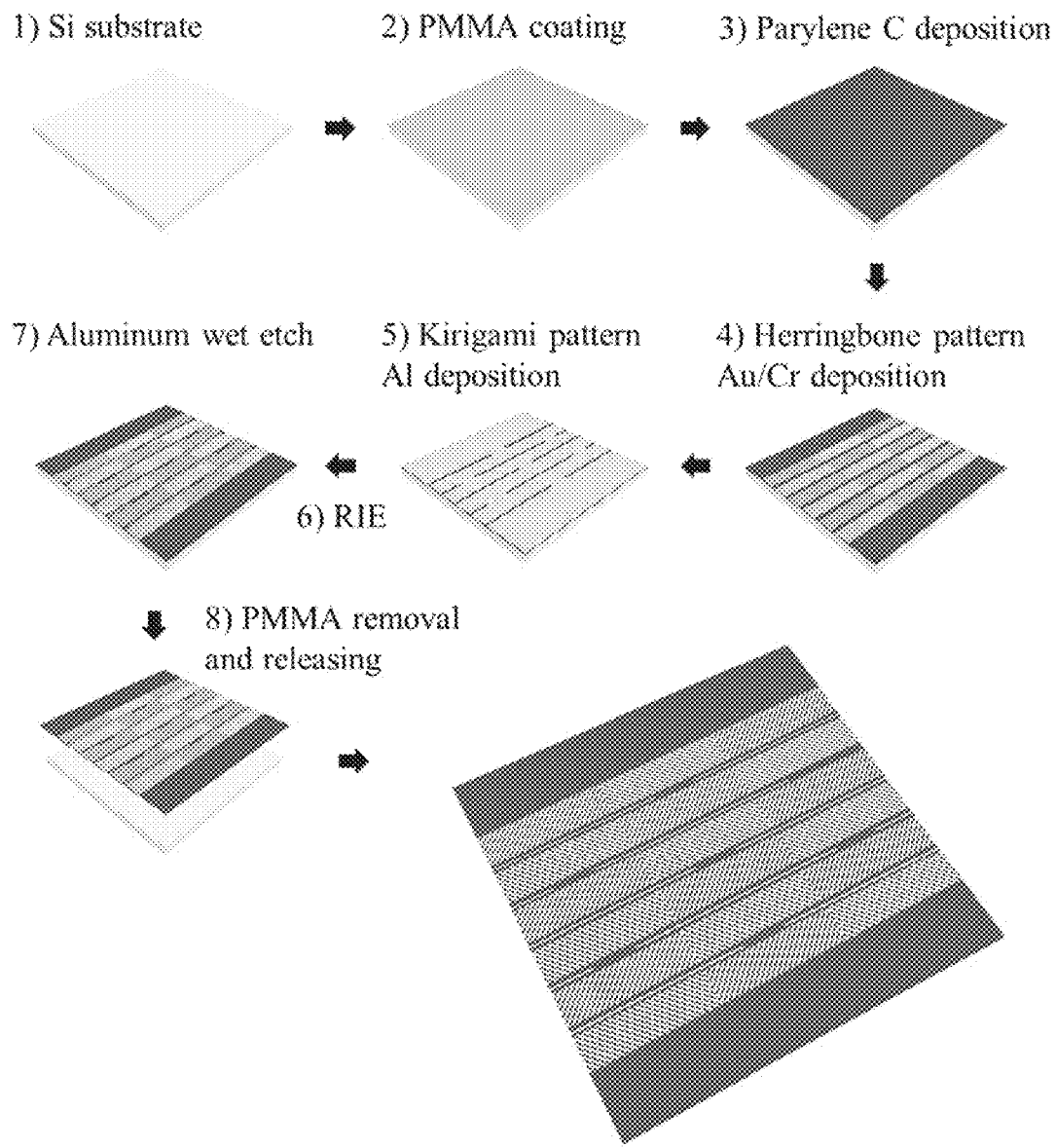

FIG. 7 is a schematic illustrating one example of a fabrication process for forming kirigami-based components in accordance with certain aspects of the present disclosure.

Figures 8A, 8B, 8C:
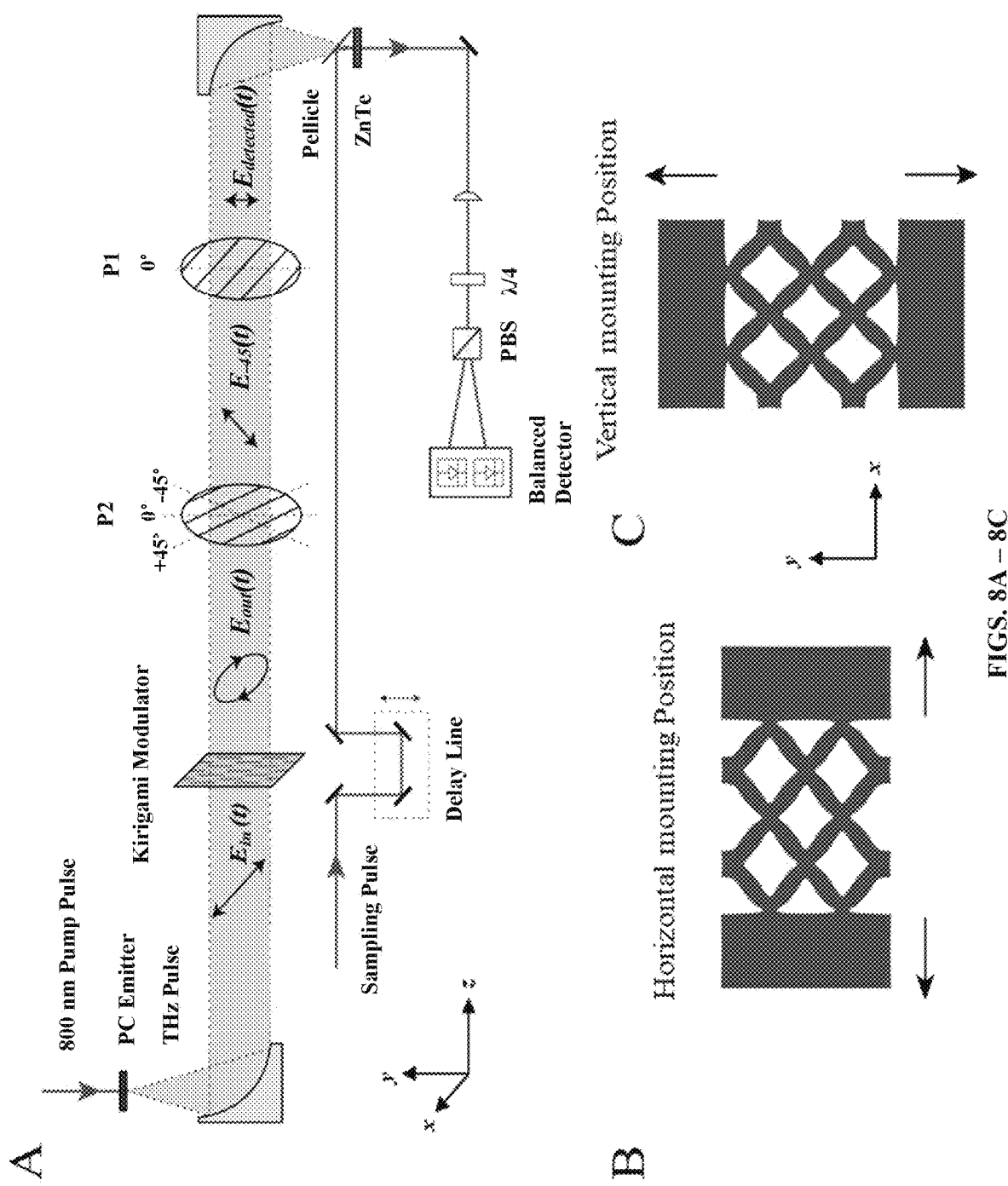

FIGS. 8A-8C are schematics of an experimental setup and sample mounting positions for THz-TDS polarimetry measurement. FIG. 8A is a schematic of THz-TDS polarimetry measurement setup. The orientation of THz polarizer P1 is fixed at 0° to allow vertically polarized waves to transmit. The orientation of polarizer P2 is rotated to +45°, −45° or 0° for three polarization-selective measurements. FIG. 8A represents the orientation of P2 at −45°, for example. FIGS. 8B and 8C show the definitions of horizontal (H) and vertical (V) mounting positions. The thick black arrows indicate the stretching directions actuated by the piezo-controller horizontally for FIG. 8B and vertically for FIG. 8C.

Figures 9A, 9B, 9C, 9D, 9E, 9F, 9G, 9H:
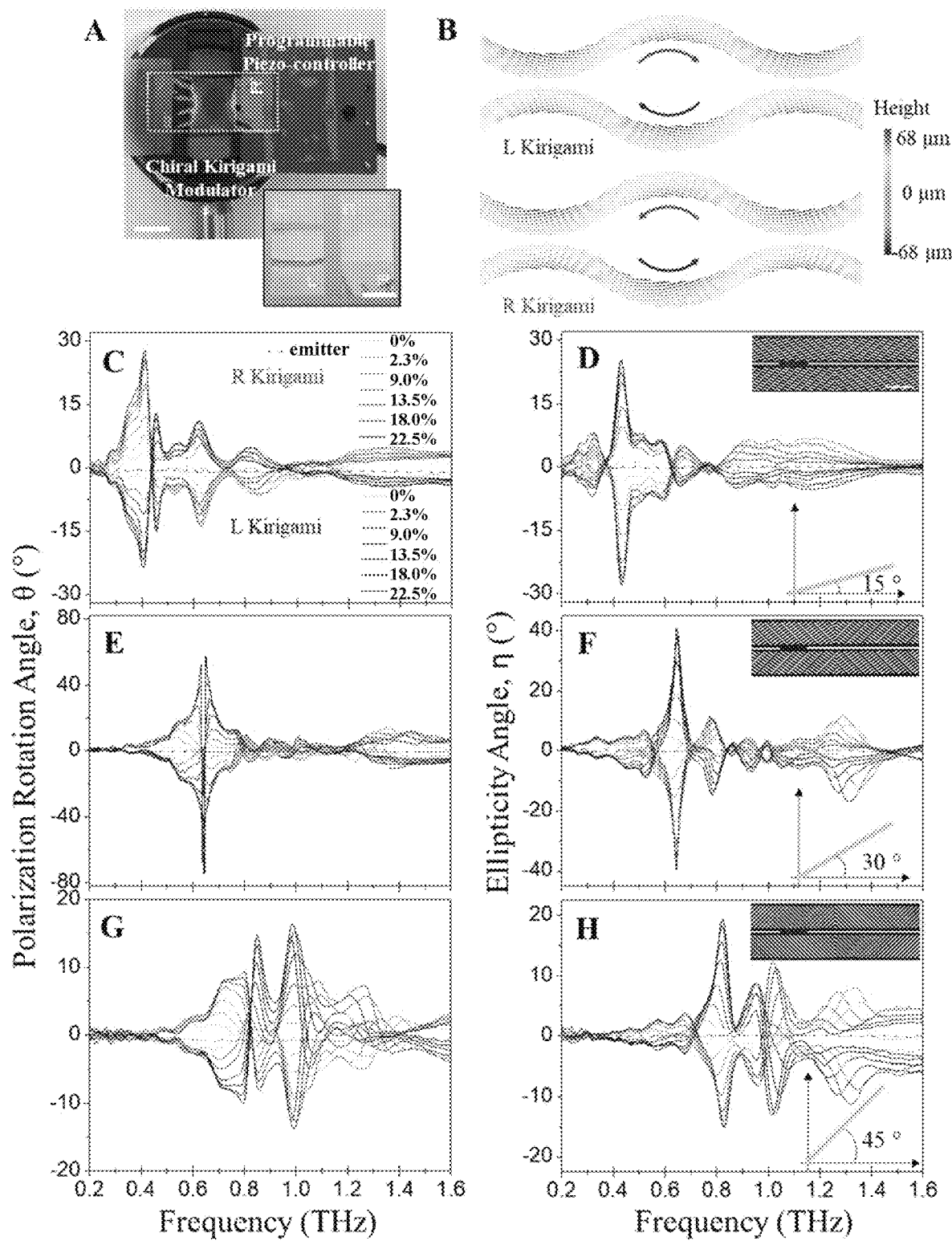

FIGS. 9A-9H show THz-TDS measurement of a chiral kirigami-based modulator prepared in accordance with certain aspects of the present disclosure. FIG. 9A shows a kirigami-based grating component mounted on a 3D printed rotatable optical holder with a piezoelectric controller. The subset figure shows a photo image of left and right handed chiral kirigami-based substrates. A herringbone patterned gold (Au) zone can be seen. Both of scale bars are 1 cm. FIG. 9B shows a contour map of a kirigami-based modulator reconstructed from laser confocal microscope images. FIGS. 9C, 9E, and 9G are results of polarization rotation angle of kirigami-based components prepared in accordance with certain aspects of the present disclosure having slanted Au angles ($\varphi$) of 15, 30, 45 degree with respect to strain (%), respectively. FIGS. 9D, 9F, and 9H show results of consequent ellipticity angle of kirigami-based components prepared in accordance with certain aspects of the present disclosure having slanted Au angles ($\varphi$) of 15, 30, 45 degree with respect to various strain, respectively. Inset shows optical microscope images of each kirigami-based sample. Scale bar in FIG. 9D is 100 µm.

Figures 10A, 10B, 10C, 10D:
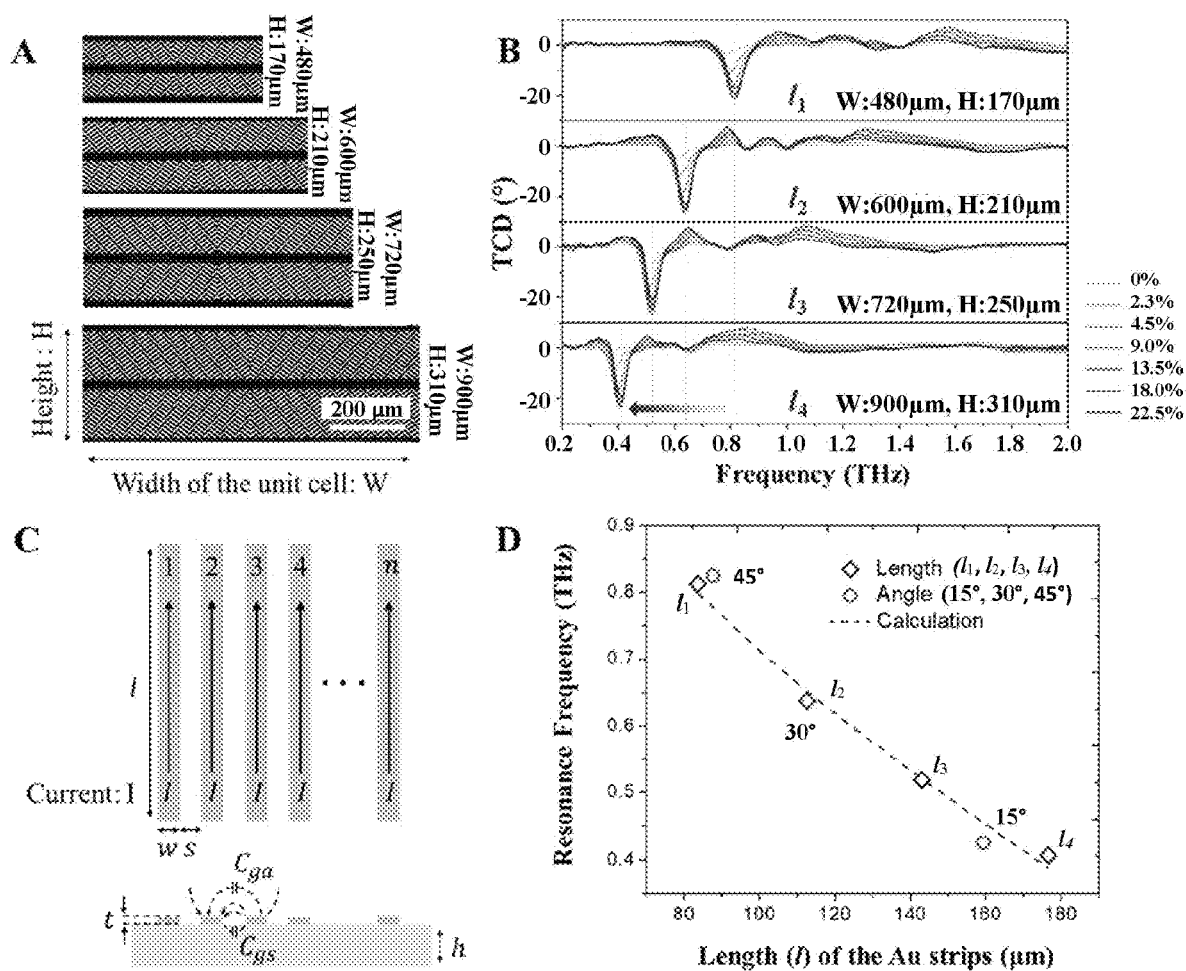

FIGS. 10A-10D explore a physical meaning of resonance frequency. FIG. 10A shows an optical microscope image of various length of unit cells of the micropatterns formed on at least one surface of a kirigami-based component prepared in accordance with certain aspects of the present disclosure. All samples have $\varphi$ of 30°. Scale bar in FIG. 10A is 200 FIG. 10B shows a result of measured TCD from R-kirigami modulator with various length of unit cell. FIG. 10C shows an upper figure with parallel conducting strips to obtain total inductance of this configuration. The lower portion of FIG. 10C is for calculating capacitance of array of strips. FIG. 10D shows a relation between resonance frequency and average length (l) of the Au strips.

Figures 11A, 11B, 11C, 11D:
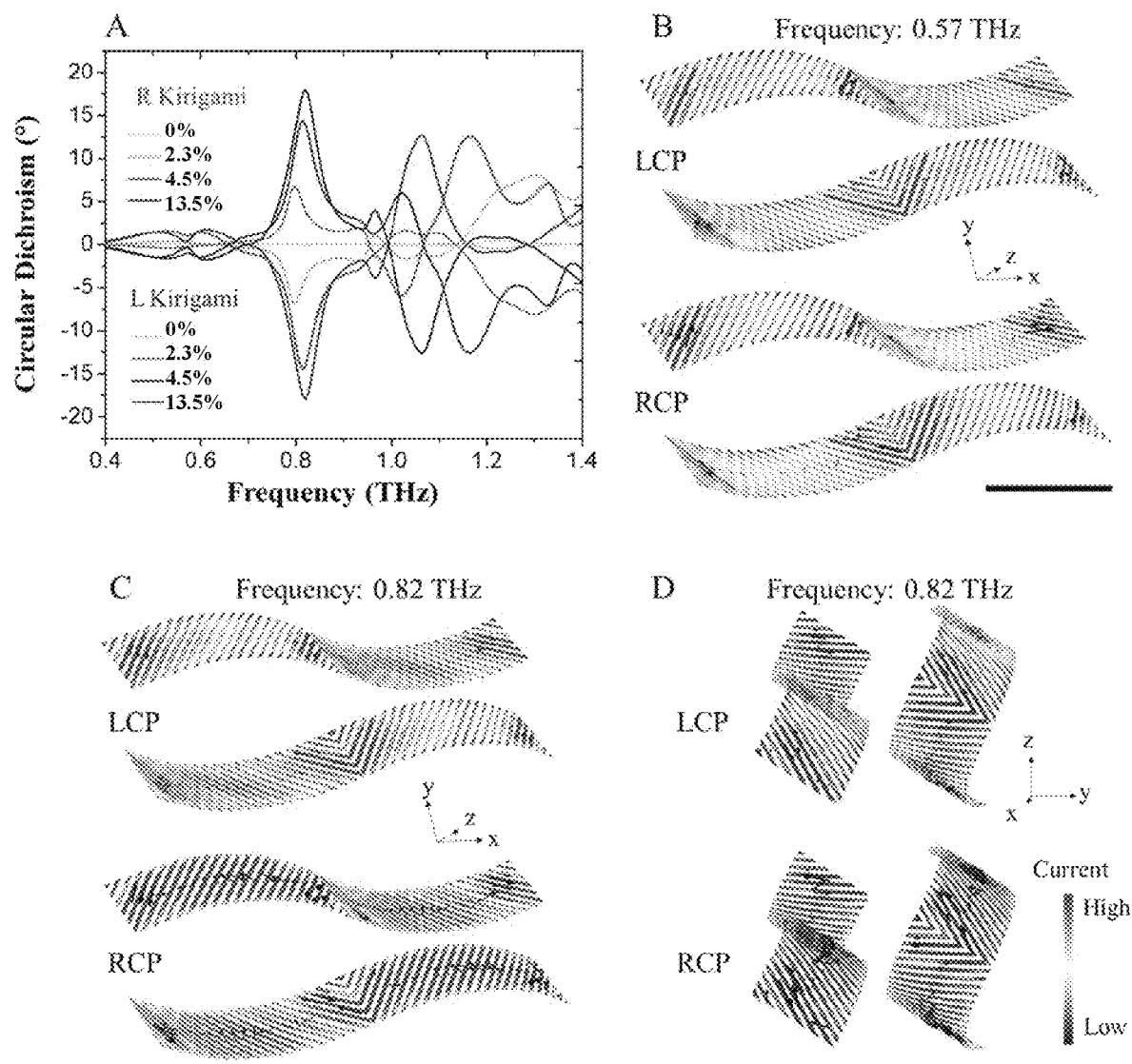

FIGS. 11A-11D show calculated circular dichroism and time-averaged current norm distributions on one embodiment of a kirigami-based component prepared in accordance with one variation of the present disclosure (having a 45 degree inclination angle/slanted kirigami modulator). FIG. 11A is calculated circular dichroism spectrum for 4 deformation states. FIGS. 11B and 11C show tilted views of current norm distributions of R kirigami at the frequency of 0.57 THz, 0.82 THz, respectively. FIG. 11D shows a side view of current norm distributions of R kirigami at 0.82 THz. Black arrows indicate the current directions. A scale bar is 200 µm.

Figures 12A, 12B, 12C, 12D, 12E, 12F, 12G, 12H:
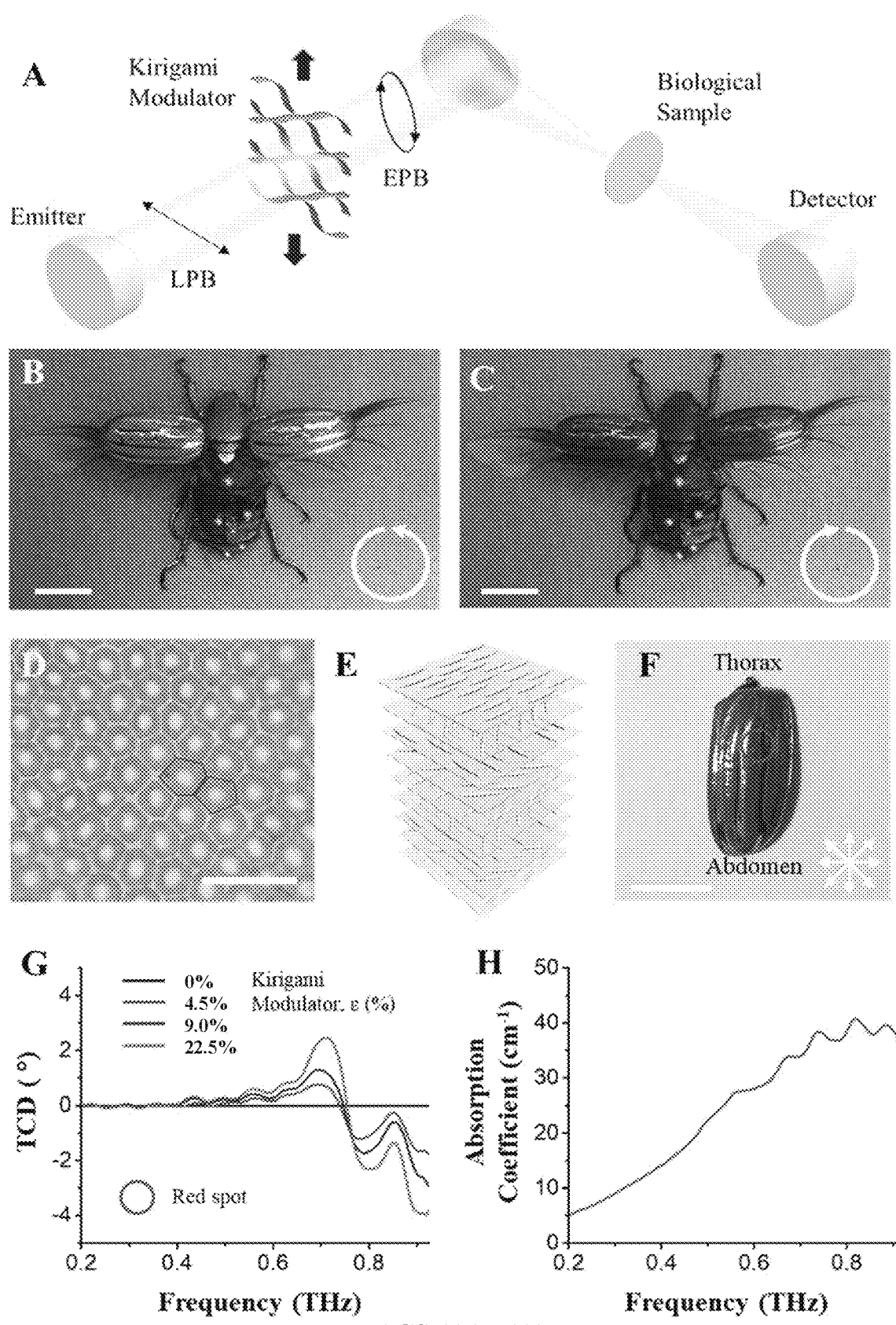

FIGS. 12A-12H show measurements of TCD using kirigami chiroptical modulator. FIG. 12A shows a schematic of TCD spectroscopy using a kirigami-based modulator device prepared in accordance with certain aspects of the present disclosure. A focused THz beam with an approximate 500 µm spot size is used to explore biological sample. LPB and EPB indicate the linearly and elliptically polarized beam in respectively. FIGS. 12B and 12C show photographs of a beetle *C. gloriosa* with a left and right circular polarizer front of the camera, respectively. FIG. 12D shows an optical microscopy image of the exoskeleton of beetle *C. gloriosa*. The shape of the cells is pentagonal in blue, hexagonal in red and heptagonal in orange. Scale bar is 20 µm. FIG. 12E show a schematic representation of Bouligand structure. FIG. 12F shows an image of an elytron of *C. gloriosa* without polarizer. The circle indicates the spot corresponding to the TCD measurements. FIG. 12G shows TCD spectrum from *C. gloriosa* measured by the kirigami-based modulator at four different strains (%). FIG. 12H shows measured absorption coefficient of *C. gloriosa*. Scale bars in FIGS. 12B, 12C, and 12F are 1 cm.

Figures 13A, 13B, 13C, 13D, 13E:
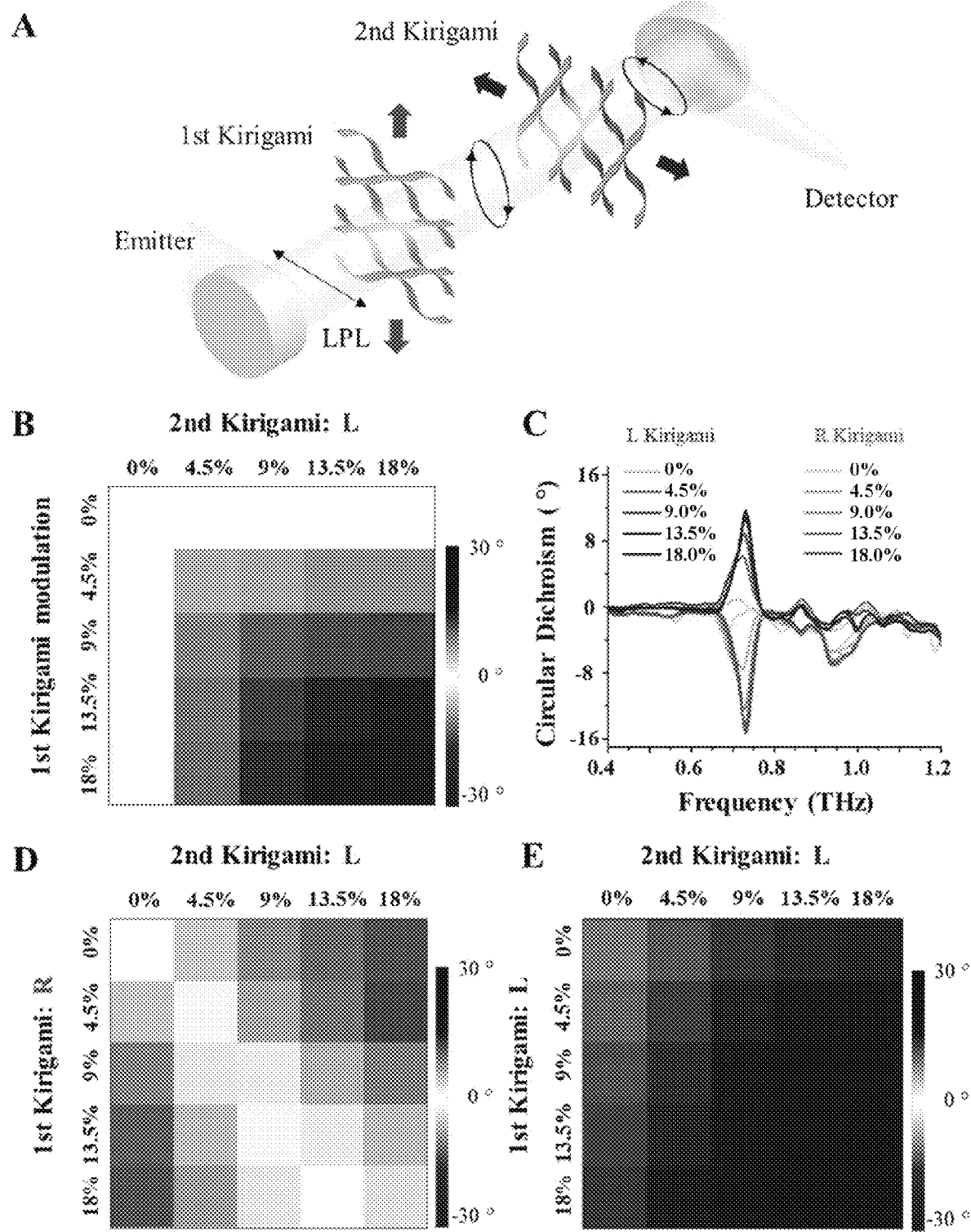

FIGS. 13A-13E show a device having stacked kirigami-based modulator prepared in accordance with certain aspects of the present disclosure for TCD spectroscopy and secure communication. FIG. 13A shows a schematic of a device for TCD spectroscopy having a pair of stacked kirigami-based modulators prepared in accordance with certain aspects of the present disclosure. LPL and CPL indicate the linearly and circularly polarized light, respectively. FIG. 13B shows a matrix of TCD for a second chiral kirigami-based sample measured by first chiral kirigami-based modulator. FIG. 13C shows a spectrum of TCD using left- and right-CPL generated by first chiral kirigami modulator. FIG. 13D shows a matrix of ellipticity angles between L- and R-kirigami for compensation of polarization rotation magnitudes. FIG. 13E shows a matrix between RH and RH kirigami-based components for accumulation of magnitudes. All values of TCD and ellipticity angles for matrices are used at resonance frequency of 0.73 THz.

Figure 14:
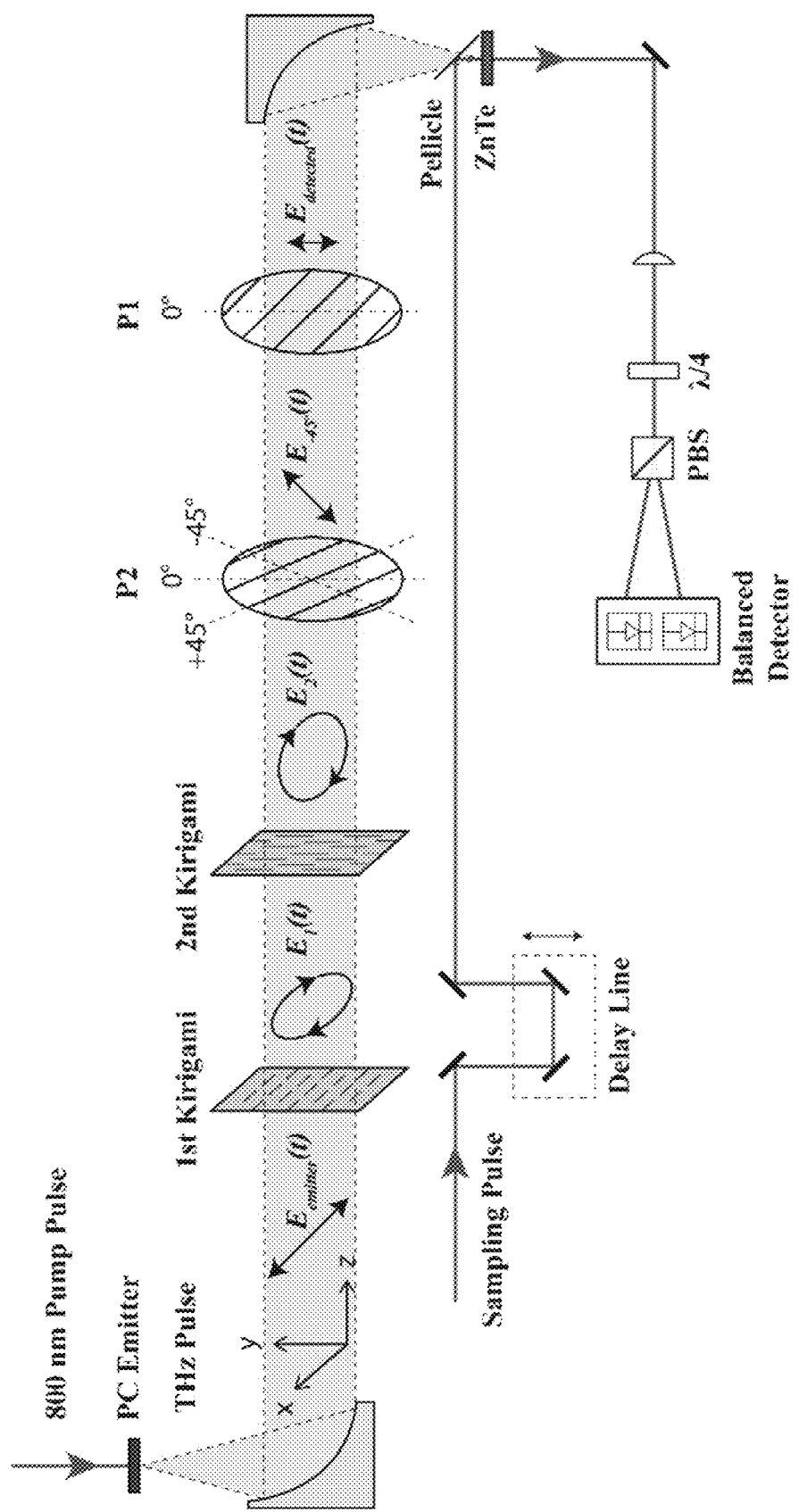

FIG. 14 is a schematic of a tunable optic device having two distinct tunable kirigami-based grating components prepared according to certain aspects of the present disclosure.

Figure 15:
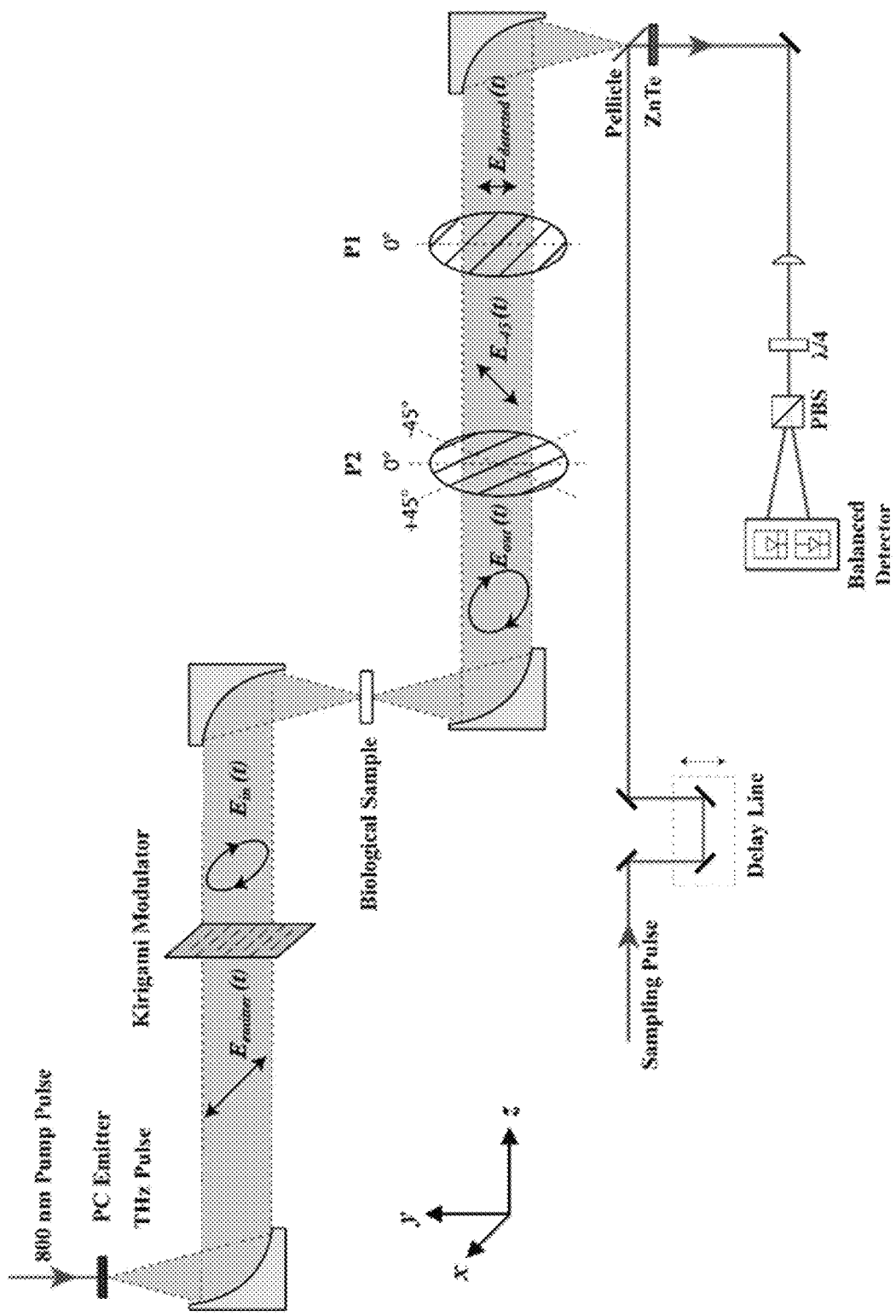

FIG. 15 is a schematic of a tunable optic device having two distinct tunable kirigami-based grating components prepared according to certain aspects of the present disclosure capable of functioning as a TCD spectrometer for a biological sample.

Figures 16A, 16B, 16C, 16D:
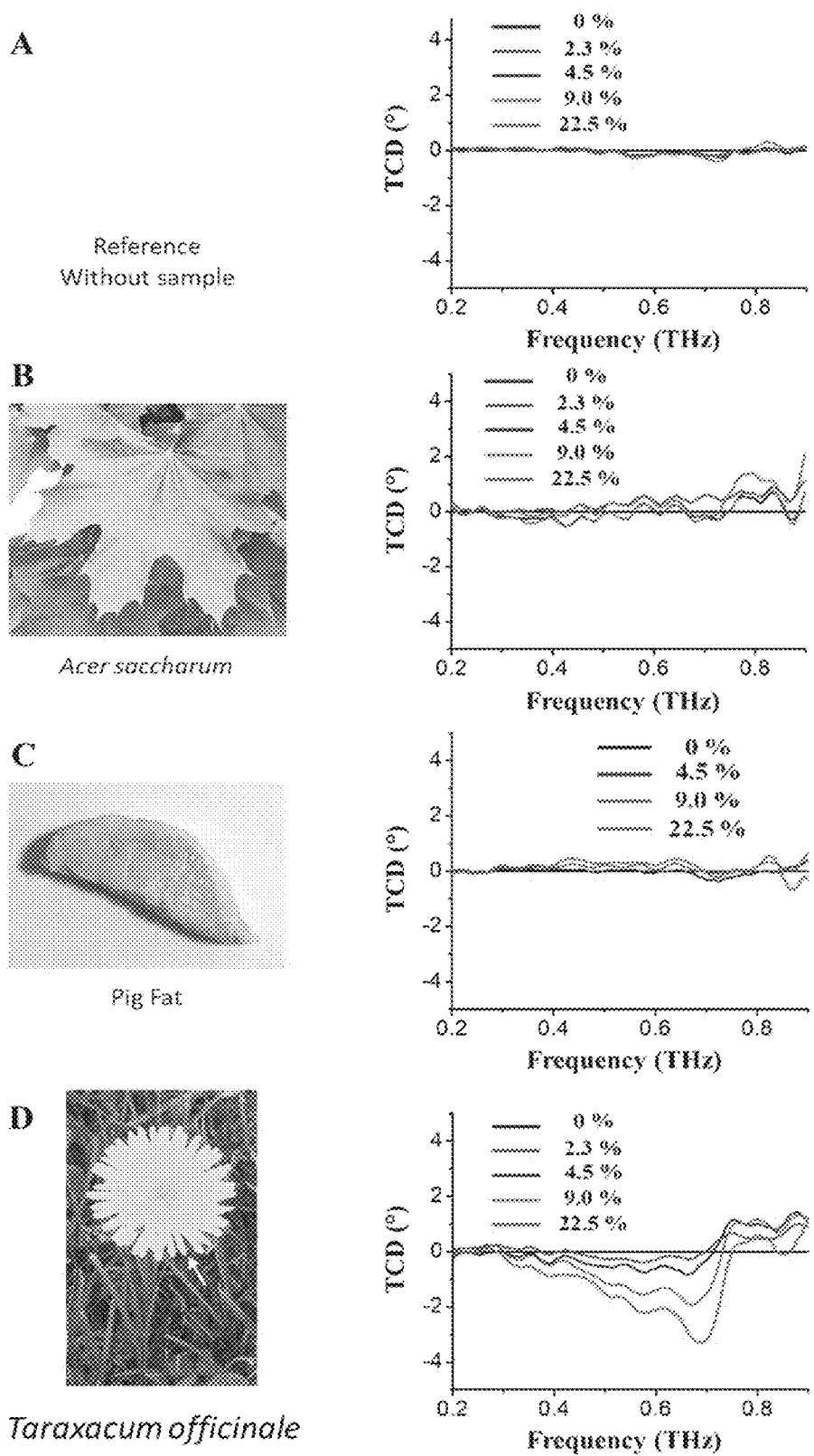

FIGS. 16A-16D show experimental TCD spectra modulated by kirigami-based components analyzing biological samples. FIG. 16A shows TCD spectra of a reference sample (i.e., a void). FIG. 16B shows a sample of a leaf. FIG. 16C shows a sample of a piece of pig fat. FIG. 16D shows a petal of a dandelion. The arrow in the dandelion image in FIG. 16D shows the actual sample, i.e. a piece of petal for the flower measurement. The legend shows the strains applied to the kirigami-based modulators. The generated ellipticity angles at 0.73 THz with applied strains are 0.3°, 5.0°, 10.2°, 16.8° and 25.6° for FIGS. 16A, 16B, 16C and 16D, respectively. The TCD curves for each sample are normalized to its own 0% curve to eliminate the slight mismatching between L- and R-kirigami-based modulators.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of" the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In certain aspects, the present disclosure employs kirigami techniques to form kirigami-based tunable optic devices or modulator devices. Kirigami is the ancient art of paper cutting that incorporates a plurality of cuts or notches to create a network on a planar material, thus providing the ability to create complex three-dimensional (3D) geometries from simple (2D) two-dimensional cut patterns. Kirigami techniques can be extended across many orders of scales from macroscale to nanoscale patterns. Modulation of the polarization states of electromagnetic waves rely on the nonlocal response of the electric or magnetic field by the topology in the light-matter interaction. Out-of-plane deformations, cyclic reconfiguration of kirigami patterns and simplicity of patterning in submillimeter scale offers untapped possibilities for modulation of THz optical beams to address the problems of efficient light modulation in THz range.

The present disclosure provides tunable optics in the THz range that can be designed and fabricated as patterned plasmonic sheets with periodic kirigami cuts. Such kirigami-based components can be implemented as analogs of photoelastic modulators for real-time modulation of THz beams, which leads to simple realization of TCD spectroscopy. Several biomaterials, exemplified by elytrons of *Chrysina gloriosa* beetles, reveal distinct TCD fingerprint spectra associated with the helical substructure in the biocomposite and their biomolecular composition.

In certain aspects, the present disclosure provides a kirigami-based optic device that comprises a tunable kirigami-based grating component. The grating component comprises a plurality of bridge structures and a plurality of openings therebetween. At least one surface of the grating component is patterned with a plasmonic material on a microscale, so that the micropattern on the surface exhibits plasmonic properties. "Microscale" as used herein encompasses "nanoscale." In certain variations, a "micro-sized" or "micrometer-sized" feature has at least one spatial dimension that is less than about 1,000 μm (i.e., 1 mm), optionally less than or equal to about 500 μm (i.e., 0.5 mm), and in certain aspects, optionally less than or equal to about 100 μm (i.e., 100,000 nm). In certain variations, a microscale feature has at least one spatial dimension that is less than about 10 μm (i.e., 10,000 nm), optionally less than about 5 μm (i.e., 5,000 nm), optionally less than about 1 μm (i.e., 1,000 nm), optionally less than about 0.5 μm (i.e., 500 nm), and in certain aspects less than or equal to about 0.1 μm (i.e., 100 nm). As will be discussed further below, a micropattern may comprise a plurality of discrete stripes of plasmonic material, where at least one dimension of the stripes is on the microscale.

The grating component having the plurality of cuts and therefore bridge structures and openings, along with a micropatterned surface, is thus configured to induce or modulate rotational polarity or otherwise manipulate and modulate a beam of electromagnetic radiation as it passes through the plurality of openings. Thus, the surface has a micropattern formed from a plasmonic material that creates a chiral or chiroptical material. The unusually large amplitude of polarization rotation is enabled by double-scale patterns, including the micropatterned surface, such as a plurality of microscale metallic stripes, combined together with wavelength-scale kirigami cuts in the sheet. A tensioning component or tensioner, such as a piezoelectric actuator, may be attached to at least two distinct points of the tunable kirigami-based grating to reversibly stretch the tunable kirigami-based grating in at least one direction, thereby modifying the beam of electromagnetic radiation as it is transmitted through the plurality of openings in the tunable kirigami-based grating. The tunable kirigami-based sheets can be periodically driven by piezoelectric actuators, which results in chiroptically active surfaces that can function as THz or other electromagnetic wave modulators, the direct analogs of photoelastic modulators (PEM) being used in the UV-VIS range.

Therefore, in certain aspects, the kirigami-based components may be used in modulator optic devices, such as a terahertz circular dichroism (TCD) device, where the beam of electromagnetic radiation is part of the terahertz (THz) diapason, for example, having photon wavelengths from about 0.1 mm to about 1 mm and energies from about 0.001 eV to about 0.01 eV. The terahertz circular dichroism (TCD) is a commonly used quantity for characterizing the optical activity of chiral materials. It is related to the relative transmission (or absorption) difference between RCP and LCP incident waves, and can be defined and quantified by $$TCD = \tan^{-1}\left(\frac{E_R - E_L}{E_R + E_L}\right)$$

where $E_R$ and $E_L$ are the magnitudes of the transmitted waves of RCP and LCP incident beams.

In addition, the present components and devices provide the ability to realize real-time modulation of THz beams with polarization rotation (e.g., as large as) 80° over thousands of cycles without degradation. In certain other aspects, the beam of electromagnetic radiation may be in the UV to visible range (UV-VIS) having photons with wavelengths from 200 nm to 800 nm and energies from 8 eV to 1.5 eV. The unusually large amplitude of polarization rotation was enabled by double-scale patterns comprised of microscale metallic stripes together with wavelength-scale kirigami cuts. The kirigami sheets can be periodically driven by piezoelectric actuators, which results in chiroptically active surfaces functioning as THz modulators, the direct analogs of photoelastic modulators (PEM) being used in the UV-VIS range.

Circular dichroism at terahertz frequencies (TCD) affords access to low-energy vibrations of biomolecules, understanding nano-to-macro chirality transfer processes, and non-destructive identification of multiscale chiral ordering in biomaterials and live tissues. Real-time polarization modulation of THz beams also enables secure through-space communications and new modalities of THz imaging for disease diagnostics. Prior to the inventive technology, optical components for real-time modulation of circular polarization (while are plentiful in the visible range) have been non-existent for THz radiation. Such devices are applicable to investigating chirality across many fields of science, such as biochemists and structural biologists, but also in the area of optics, including new classes of optical devices based on plasmonics, metasurfaces, flat optics, and deformable/reconfigurable optics, by way of non-limiting example. Such devices prepared in accordance with certain aspects of the present disclosure can also lead to transformative advances in secure high bandwidth communication and non-invasive imaging, by way of non-limiting example.

In certain aspects, a polarization state of electromagnetic beams, exemplified by terahertz light, through a kirigami-based component can be strongly modulated by chiral kirigami patterns. The 3D topography of sheets of the kirigami-based grating component can be tuned when stretched. Therefore, in accordance with certain aspects of the present disclosure, kirigami technology provides real-time modulation of THz beams with polarization rotation as large as 80° degrees over a thousand of cycles of manipulation (e.g., cycles stretching or twisting as the kirigami-based grating component is tuned). In one aspect, the beam of light passing through this kirigami-based sheet exhibits polarization rotation as high as 80° and an ellipticity angle as high as 34° due to the topological equivalency of a helix. The unusually large amplitude of polarization rotation is enabled by the kirigami sheets with double-scale patterning comprised of the nanoscale metallic stripes being patterned on the surface in addition to microscale 3D topography defined by cuts. Being driven by piezoelectric actuators, kirigami sheets serve as THz analogs of photoelastic modulators (PEMs) for the UV-VIS range. The chiroptically active kirigami materials provided by certain aspects of the present disclosure open a possibility of compact polarization modulators that can be deterministically engineered for virtually any desirable diapason of photons from UV to THz and beyond. Chiral kirigami topology provides the ability to manipulate polarization states with compact electromagnetic modulators.

In certain aspects, the present disclosure provides a structure comprising a sheet or film of material, which may comprise a polymer. In certain variations, the present disclosure contemplates a multilayered structure having at least two layers, where at least one layer is a polymeric material. The polymeric material may comprise a polymer, such as a polyelectrolyte. The polymer may be an elastomeric or thermoplastic polymer. In certain aspects, the structure is transparent to a predetermined range of wavelengths, for example, a range of wavelengths that correspond to the beam of electromagnetic radiation to be modulated or otherwise processed by the optic device. In certain variations, the polymer comprises parylene or other polymers and nanocomposites exemplified by, but not limited to, composites comprising cellulose nanoclay, nanoparticles, aramid nanofibers, and the like. Parylene, described herein as a representative example of these materials, is a relatively stiff polymer (Young's modulus E=2.8 GPa) having a high transparency across the THz spectrum. In other variations, the structure may be formed of cellulose paper. In certain variations, the polymeric material may be a composite or nanocomposite material that comprises at least one reinforcement material distributed within the polymeric material. A composite material may comprise at least one reinforcement material distributed therein, such as nanoparticles.

Figure 1:
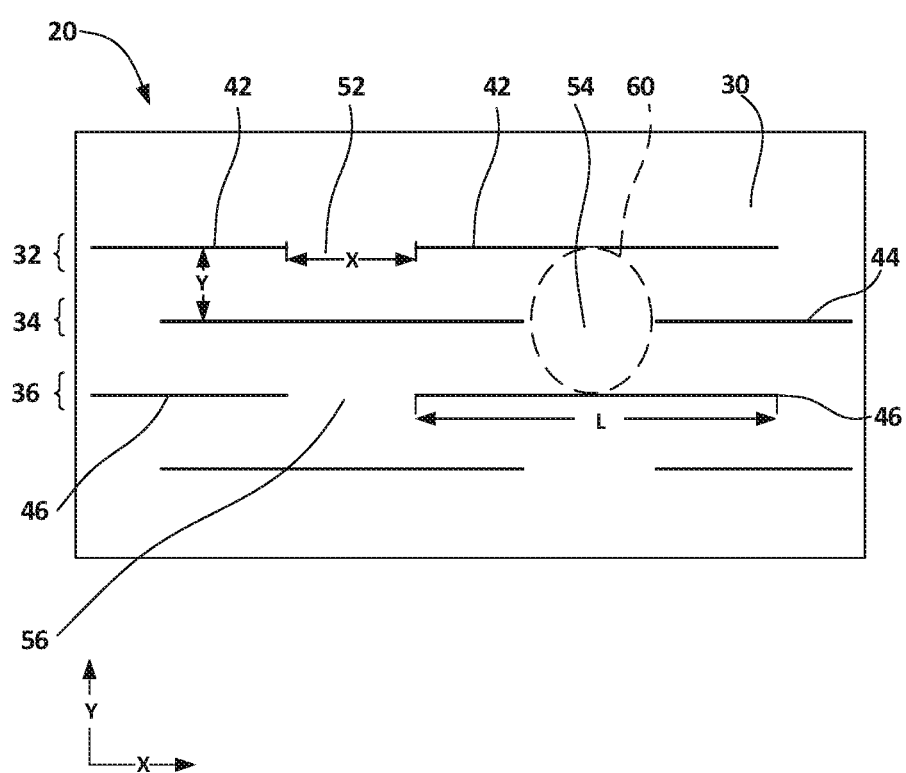
FIG. 1 shows a schematic of a kirigami-based sheet component having a plurality of cuts formed therein in a face centered rectangular lattice in accordance with certain aspects of the present disclosure.

The structure may be in a planar form, such as a sheet, in an initial state (prior to being cut), but may be folded or shaped into a three-dimensional structure and thus used as a kirigami-based structural component after the cutting process. By way of example, FIG. 1 shows a structure 20 including a portion of an exemplary polymeric material sheet 30 having a body with a tessellated or cut pattern. Sheet 30 includes a first row 32 of first discontinuous cuts 42 (that extend through the sheet 30 to create an opening) in a pattern that defines a first uncut region 52 between the discontinuous cuts 42. A discontinuous cut is a partial or discrete cut formed in the sheet 30 that leaves the entire sheet intact in its original dimensions, rather than being divided into separate smaller sheets or portions. If multiple discontinuous cuts 42 are present, desirably at least some of them are noncontiguous and unconnected with one another so that at least one uncut region remains on the sheet as a bridge between the discontinuous sheets. While many cut patterns are possible, a simple kirigami pattern of straight lines in a centered rectangular arrangement as shown in FIG. 1 is used herein as an exemplary pattern. The first uncut region 52 has a length "x." Each discontinuous cut 42 has a length "L." More complex cut patterns aside from parallel lines are also contemplated.

In certain aspects, the length of each discontinuous cut (e.g., discontinuous cut 42) may be on the micro- meso-, nano- and/or macroscales. Macroscale is typically considered to have a dimension of greater than or equal to about 500 µm (0.5 mm), while mesoscale is greater than or equal to about 1 µm (1,000 nm) to less than or equal to about 500 µm (0.5 mm). Microscale is typically considered to be less than or equal to about 100 µm (0.1 mm), while nanoscale is typically less than or equal to about 1 µm (1,000 nm). Thus, conventional mesoscale, microscale, and nanoscale dimensions may be considered to overlap. In certain aspects, the length of each discontinuous cut 42 may be on a microscale, for example, a length that is less than about 100 µm (i.e., 100,000 nm), optionally less than about 50 µm (i.e., 50,000 nm), optionally less than about 10 µm (i.e., 10,000 nm), optionally less than or equal to about 5 µm (i.e., 5,000 nm), and in certain aspects less than or equal to about 1 µm (i.e., 1,000 nm). In certain aspects, the discontinuous cuts 42 may have a length that is less than about 50 µm (i.e., 50,000 nm), optionally less than about 10 µm (i.e., 10,000 nm), and optionally less than about 1 µm (i.e., less than about 1,000 nm).

In certain variations, these dimensions can be reduced by at least 100 times to a nanoscale, for example a cut having a length of less than or equal to about 1 µm (1,000 nm), optionally less than or equal to about 500 nm, optionally less than or equal to about 400 nm, optionally less than or equal to about 300 nm, optionally less than or equal to about 200 nm, optionally less than or equal to about 100 nm, optionally less than or equal to about 75 nm, optionally less than or equal to about 50 nm, optionally less than or equal to about 40 nm, optionally less than or equal to about 30 nm, optionally less than or equal to about 20 nm, and in certain variations, optionally less than or equal to about 10 nm.

Thus, in certain variations, the length of each discontinuous cut 42 may be on a microscale, for example, a length that is less than about 100 µm (i.e., 100,000 nm), optionally less than about 50 µm (i.e., 50,000 nm), optionally less than about 10 µm (i.e., 10,000 nm), optionally less than or equal to about 5 µm (i.e., 5,000 nm), and in certain aspects less than or equal to about 1 µm (i.e., 1,000 nm). In certain aspects, the discontinuous cuts 42 may have a length that is less than about 50 µm (i.e., 50,000 nm), optionally less than about 10 µm (i.e., 10,000 nm), and optionally less than about 1 µm (i.e., less than about 1,000 nm). In certain variations, these dimensions can be reduced by at least 100 times, as discussed above. It should be noted that "x" and "L" may vary within rows depending on the pattern formed, although in preferred aspects, these dimensions remain constant.

A second row 34 of second discontinuous cuts 44 is also patterned on the sheet 30. The second discontinuous cuts 44 define a second uncut region 54 therebetween. A third row 36 of third discontinuous cuts 46 is also formed in the sheet 30. The third discontinuous cuts 46 define a third uncut region 56 therebetween. It should be noted that the first row 32, second row 34, and third row 36 are used for exemplary and nominative purposes, but the tessellated pattern of cuts on the surface of sheet 30 may be in excess of three distinct rows. The first row 32 is spaced apart from the second row 34, as shown by the designation "y." The second row 34 is likewise spaced apart from the third row 36. It should be noted that "y" may vary between rows, although in certain aspects, it remains constant between rows. Such spacing between rows may likewise be on a micro- meso-, nano- and/or macroscale, as described above.

Notably, the first discontinuous cuts 42 in the first row 32 are offset in a lateral direction (along the dimension/axis shown as "x") from the second discontinuous cuts 44 in the second row 34, thus forming a tessellated pattern. Likewise, the second discontinuous cuts 44 in the second row 34 are offset in a lateral direction from the third discontinuous cuts 46 in the third row 36. Thus, the first uncut region 52, second uncut region 54, and third uncut region 56 in each respective row cooperate to form a structural bridge 60 that extends from the first row 32, across second row 34, and to third row

36. In this regard, the sheet 30 having the tessellated surface with the plurality of discontinuous cuts (e.g., 42, 44, and 46) can be stretched in at least one direction (e.g., along the dimension/axis shown as "y" or "x").

Figure 2:
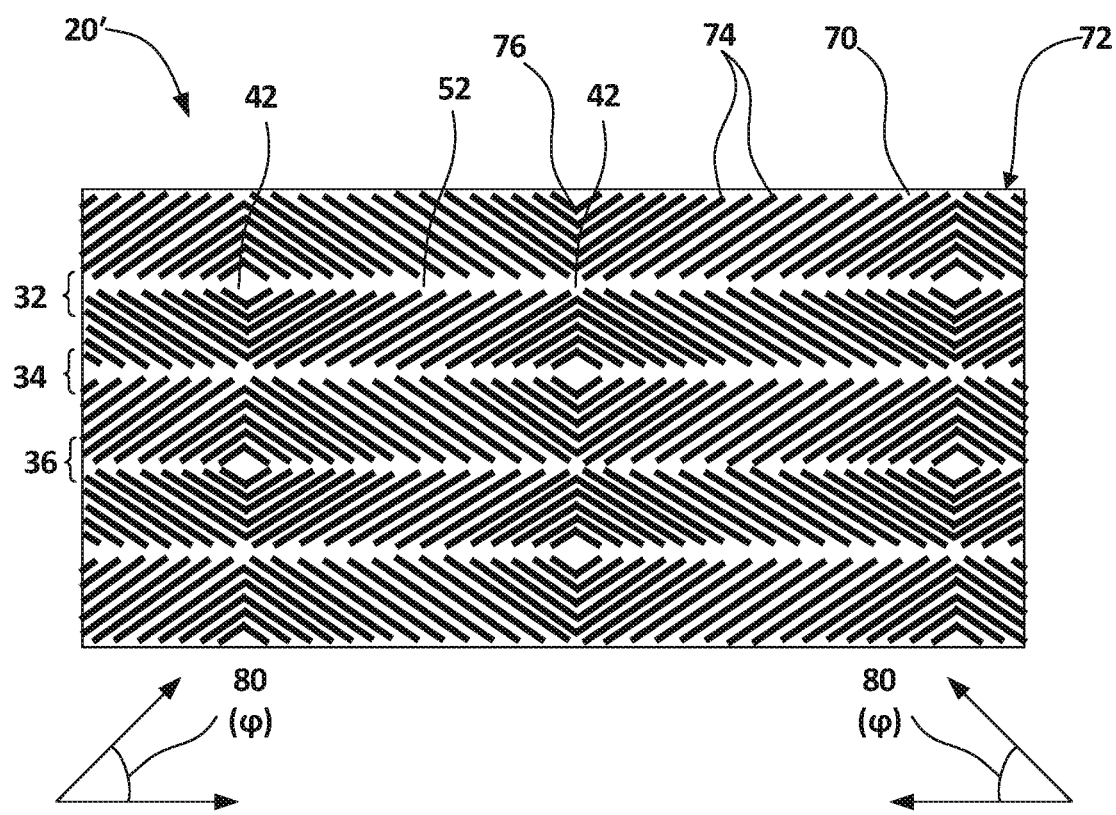
FIG. 2 shows a schematic of a kirigami-based sheet component like that in FIG. 1 further having a pattern of microstripes formed of a plasmonic metallic material in accordance with certain aspects of the present disclosure.

FIG. 2 shows an example embodiment of a surface 70 of structure 20', which is similar to structure 20 shown in FIG. 1, but further has a micropattern 72 of a plasmonic material formed thereon in accordance with various aspects of the present disclosure. As noted above, the micropattern 72 can provide a chirality or chiroptical property to the surface 70 that can be tuned as the structure has different mechanical strain levels. The micropattern 72 of the plasmonic material can create plasmonic resonance over the surface 70. To the extent that the features and components shown in FIG. 2 are the same as those in FIG. 1, they will not be described or discussed herein. The micropattern 72 comprises a plurality of stripes 74 of plasmonic material.

The plasmonic material may comprise a metal, such as gold, silver, copper, aluminum, and any alloys or combinations thereof. In other variations, the plasmonic material may be a semiconductor, such as cadmium tellurium (CdTe), indium tin oxide (ITO), and the like. In yet other variations, the plasmonic material may comprise ceramics, such as tungsten trioxide ($WO_3$), molybdenum trioxide ($MoO_3$), and the like. In yet other variations, the plasmonic material may be a carbon-based material, such as graphene, carbon dots, and/or carbon ribbons, by way of non-limiting example. Thus, in certain variations, the plasmonic material may comprise a material selected from the group consisting of gold (Au), alloys of gold (Au), silver (Ag), alloys of silver (Ag), copper (Cu), alloys of copper (Cu), aluminum (Al), alloys of aluminum (Al), cadmium tellurium (CdTe), indium tin oxide (ITO), tungsten trioxide ($WO_3$), molybdenum trioxide ($MoO_3$), graphene, carbon dots, carbon ribbons, and combinations thereof. Thus, in certain variations, the plasmonic material may comprise a material selected from the group consisting of gold (Au), silver (Ag), copper (Cu), aluminum (Al), alloys, and combinations thereof. In one variation, the plasmonic material comprises gold (Au) or alloys thereof.

A stripe or strip is generally a discrete feature having an evident long axis (e.g., length) in comparison to other dimensions (e.g., a width or thickness). In certain variations, the metal may be gold. In certain aspects, the plurality of stripes 74 may be oriented such that they are spaced apart from, but parallel to, nearby stripes. In certain patterns, the plurality of stripes 74 may contact one another at an intersection 76. It should be noted that the design shown, spacing, and orientation of stripes 74 may be varied from those shown in the example embodiment of FIG. 2. The pattern of plasmonic material disposed on the surface 70 may form rows of discrete rows of plasmonic material stripes defined between the distinct rows (32, 34, 36) of discontinuous cuts 42. In one variation, such a pattern may be considered to be a herringbone pattern. Other patterns of plasmonic materials are contemplated; however, including those that create a plasmonic surface that can help to induce chirality to a passing beam of electromagnetic radiation.

An example embodiment is shown in FIGS. 3A-3C. A length ($L_{cut}$) and a height ($H_{cut}$) of each individual cut are shown in FIG. 3A. Notably, a cut is used interchangeably with an opening in the context of the present disclosure, although as discussed below, the sheet component may be subject to stress that changes the size and shape of each opening formed by the cut under different strain levels. In certain variations, the length ($L_{cut}$) may be greater than or equal to about 1 µm to less than or equal to about 1,000 µm (1 mm), optionally greater than or equal to about 50 µm to less than or equal to about 750 µm, optionally greater than or equal to about 100 µm to less than or equal to about 500 µm. In certain variations, the height ($H_{cut}$) may be greater than or equal to about 100 nm to less than or equal to about 15 µm, optionally greater than or equal to about 500 nm to less than or equal to about 10 µm, optionally greater than or equal to about 1 µm to less than or equal to about 5 µm. In one variation, as shown in FIG. 3A, the length ($L_{cut}$) is about 500 µm and the height ($H_{cut}$) is about 5 µm.

In certain variations, a horizontal ($S_{cut}$) spacing in bridge regions defined between respective cuts may be greater than or equal to about 50 µm to less than or equal to about 1,000 µm (1 mm), optionally greater than or equal to about 50 µm to less than or equal to about 750 µm, optionally greater than or equal to about 75 µm to less than or equal to about 500 µm, and in certain variations, greater than or equal to about 75 µm to less than or equal to about 250 µm. In certain other variations, a vertical ($V_{cut}$) spacing in bridge regions defined between respective cuts may be greater than or equal to about 50 µm to less than or equal to about 1,000 µm (1 mm), optionally greater than or equal to about 50 µm to less than or equal to about 750 µm, optionally greater than or equal to about 75 µm to less than or equal to about 500 µm, and in certain variations, greater than or equal to about 75 µm to less than or equal to about 250 µm. The horizontal ($S_{cut}$) and vertical ($V_{cut}$) spacing in the bridge regions between cuts are about 100 µm in FIG. 3A.

A horizontal periodicity ($p_{hcut}$) for each cut in the pattern (from cut to cut along a line) may be greater than or equal to about 2 µm to less than or equal to about 1,000 µm (1 mm), optionally greater than or equal to about 50 µm to less than or equal to about 1,000 µm, optionally greater than or equal to about 100 µm to less than or equal to about 750 µm, optionally greater than or equal to about 250 µm to less than or equal to about 750 µm, and in certain variations like that shown in FIG. 3A, optionally about 600 µm. A vertical periodicity ($p_{vcut}$) for each cut in the pattern (extending from cut to cut between distinct rows of cuts) may be greater than or equal to about 2 µm to less than or equal to about 1,000 µm (1 mm), optionally greater than or equal to about 50 µm to less than or equal to about 750 µm, optionally greater than or equal to about 75 µm to less than or equal to about 500 µm, optionally greater than or equal to about 75 µm to less than or equal to about 250 µm, and in certain variations like that shown in FIG. 3A, optionally about 105 µm.

The sheet may have a thickness of greater than or equal to about 100 nm to less than or equal to about 25 µm, optionally greater than or equal to about 500 nm to less than or equal to about 20 µm, optionally greater than or equal to about 750 nm to less than or equal to about 15 µm, optionally greater than or equal to about 1 µm to less than or equal to about 10 µm, and in certain variations, optionally greater than or equal to about 1 µm to less than or equal to about 7 µm. In the variation shown in FIG. 3A, the sheet has a thickness of about 6 µm.

As shown in FIG. 3C, a unit cell is defined as a repeating unit of the periodic kirigami lattice, which in the design shown, includes two distinct metallic striped domains in different directions (e.g., diametrically opposed directions) in contact with one another. As shown, the unit cell extends height-wise across two rows cuts and bridges two distinct cuts (thus encompassing a portion of two distinct cuts and a bridge region). A unit cell width ($W_{unit}$) may be greater than or equal to about 50 µm to less than or equal to about 1,000 µm (1 mm), optionally greater than or equal to about 100 µm to less than or equal to about 1,000 µm, optionally greater than or equal to about 250 µm to less than or equal to about 750 µm, and optionally greater than or equal to about 500 µm to less than or equal to about 750 µm. In the example embodiment shown in FIG. 3C, the unit cell width ($W_{unit}$) is about 600 µm. A unit cell height ($H_{unit}$) may be greater than or equal to about 10 µm to less than or equal to about 750 µm, optionally greater than or equal to about 50 µm to less than or equal to about 500 µm, and optionally greater than or equal to about 100 µm to less than or equal to about 300 µm. In the example embodiment shown in FIG. 3C, the unit cell height ($H_{unit}$) is about 210 µm.

FIG. 3B shows a detailed view of a portion of a unit of the micropattern formed on the surface of the sheet component having the kirigami cuts. Such a design may be considered to have dual patterning, a first pattern with the kirigami cuts and a second pattern of the plasmonic material that helps to enhance the plasmonic properties of the surface. As shown, the micropattern comprises a plurality of stripes 82 formed of a metallic plasmonic material, such as gold. Each stripe 82 may have a width (w) of greater than or equal to about 100 nm to less than or equal to about 25 µm, optionally greater than or equal to about 500 nm to less than or equal to about 20 µm, optionally greater than or equal to about 750 nm to less than or equal to about 15 µm, optionally greater than or equal to about 1 µm to less than or equal to about 10 µm, and in certain variations, optionally greater than or equal to about 1 µm to less than or equal to about 5 µm. In the variation shown in FIG. 3B, the stripes 82 have a width (w) of about 5 µm. Each stripe 82 may be spaced apart from an adjacent strip by a distance (d) of greater than or equal to about 100 nm to less than or equal to about 25 µm, optionally greater than or equal to about 500 nm to less than or equal to about 25 µm, optionally greater than or equal to about 750 nm to less than or equal to about 20 µm, optionally greater than or equal to about 1 µm to less than or equal to about 20 µm, and in certain variations, optionally greater than or equal to about 5 µm to less than or equal to about 15 µm. In the variation shown in FIG. 3B, the stripes 82 are spaced apart from one another at a distance (d) of about 10 µm. Each stripe 82 may have a varying length depending on the portion of the pattern that it occupies.

The plurality of stripes 82 are disposed at a slant angle or inclination angle ($\varphi$) to the major axis or length ($L_{cut}$) of the cuts. More specifically, the slant angle ($\varphi$) (shown as 80 in FIG. 2) is defined as angle between a longitudinal direction of cut (corresponding to length ($L_{cut}$)) and the metallic stripe 82. In certain variations, the slant angle ($\varphi$) is greater than or equal to about 1° to less than or equal to about 90°, optionally greater than or equal to about 3° to less than or equal to about 70°, optionally greater than or equal to about 5° to less than or equal to about 45°, optionally greater than or equal to about 15° to less than or equal to about 45°. In certain example embodiments, the slant angle may be 15°, optionally 30°, optionally 37.5°, or optionally 45°. Notably, the slant angle may change orientation throughout the pattern, but may remain at the same angle.

As shown in FIG. 3B, a domain of the striped micropattern (that is a subunit of the unit cell that repeats within the pattern in opposing directions or orientations). Notably, a unit cell in FIG. 3C may include four distinct domains of the stripes in different orientations (e.g., diametrically opposed to one another). Each domain may have a domain width ($W_{dom}$) of greater than or equal to about 25 µm to less than or equal to about 1,000 µm (1 mm), optionally greater than or equal to about 50 µm to less than or equal to about 750 µm, optionally greater than or equal to about 100 µm to less than or equal to about 500 µm, and optionally greater than or equal to about 250 µm to less than or equal to about 500 µm. In the example embodiment shown in FIG. 3B, the domain width ($W_{dom}$) is about 600 µm. A domain height ($H_{dom}$) may be greater than or equal to about 10 µm to less than or equal to about 500 µm, optionally greater than or equal to about 25 µm to less than or equal to about 250 µm, optionally greater than or equal to about 50 µm to less than or equal to about 100 µm, and optionally greater than or equal to about 75 µm to less than or equal to about 100 µm. In the example embodiment shown in FIG. 3B, the domain height ($H_{dom}$) is about 80 µm.

The present disclosure provides in various aspects, a tunable kirigami-based component, that may be formed of a sheet comprising a polymer. By "tunable," it is meant that the structure can be manipulated in one or more directions and is considered to be stretchable. "Stretchable" means that materials, structures, components, and devices are capable of withstanding strain, without fracturing or other mechanical failure. Stretchable materials in accordance with certain aspects of the present disclosure are extensible and thus are capable of stretching and/or compression, at least to some degree, without damage, mechanical failure or significant degradation in performance.

In certain aspects, tunable materials, structures, components, and devices may undergo a maximum tensile strain of at least about 25% without fracturing; optionally greater than or equal to about 50% without fracturing, optionally greater than or equal to about 75% without fracturing, and in certain aspects, optionally greater than or equal to about 100% without fracturing.

Stretchable or tunable materials of the present disclosure may also be flexible, in addition to being stretchable, and thus are capable of significant elongation, flexing, bending or other deformation along one or more axes. The term "flexible" can refer to the ability of a material, structure, or component to be deformed (for example, into a curved shape) without undergoing a permanent transformation that introduces significant strain, such as strain indicating a failure point of a material, structure, or component.

For example, for certain materials, creating the surface having patterned cuts in accordance with certain aspects of the present disclosure can increase ultimate strain of initially rigid sheets to greater than or equal to about 25% from an initial ultimate strain prior to any cutting, optionally greater than or equal to about 50%, optionally greater than or equal to about 75%, and in certain variations, optionally greater than or equal to about 100%.

Notably, a wide range of maximum attainable strains or expansion levels can be achieved based on the geometry of the cut pattern used. The ultimate strain is thus determined by the geometry. The ultimate strain (% strain) is a ratio between a final achievable length, while being stretched to a point before the structure breaks, over the original or initial length ($L_i$):

$$\% \text{ strain} = \frac{\Delta L}{L_i} = \frac{L_c - x - 2y}{2y}$$

where $L_c$ is a length of the cut, x is spacing between discontinuous cuts, and y is distance between discrete rows of discontinuous cuts. Thus, in certain variations, the polymeric materials having a surface with patterned cuts in accordance with certain aspects of the present disclosure can increase ultimate strain to greater than or equal to about 100%.

In various aspects, the kirigami-based polymeric structure is stretchable in at least one direction. By using kirigami out-of-plane features and twisting or stretching the polymeric structure, the present disclosure contemplates use of such components as chiroptical structures or modulators of beams of electromagnetic energy.

In certain variations, the kirigami modulators can be made from parylene—a polymer having a high Young's modulus E=2.8 GPa, high transparency in the THz region, and high chemical resistance. Although many cut patterns are contemplated, a kirigami pattern comprising straight cuts with a length L and periodicity of $p_{cutting}$=600 µm in a face centered rectangular lattice is used because of its highly reproducible deformations under repeated tensile strain, ε, as shown in FIGS. 4A-4C. Before stretching, this 2D structure displays mirror symmetry.

FIG. 4A shows a kirigami modulator at strain values of 0%, 22.5%, 40%, 80% and 120% (from left to right). FIGS. 4B and 4C show stress-strain curves and cycling properties of the chiral kirigami modulator. Sections I, II and III indicate the regions of in-plane elastic deformation, out-of-plane elastic deformation and plastic deformation with pattern collapse, respectively.

Upon stretching, such a two dimensional (2D) pattern transforms into an array of alternating convex and concave out-of-plane elements (FIGS. 5A-5D and 6A-6H). FIG. 5A shows a herringbone pattern of a metallic plasmonic material (e.g., gold (Au) stripes) deposited on a kirigami-cut substrate, which can tune the polarization rotation angle and ellipticity by mechanical force that equates to a strain (ε) level imparted to the kirigami-cut sheet component. In certain variations, a polarization rotation angle (θ) of a beam of electromagnetic energy after passing through one or more openings in a kirigami-based component according to certain aspects of the present disclosure may be greater than or equal about 50°, optionally greater than or equal to about 55°, optionally greater than or equal to about 60°, optionally greater than or equal to about 65°, optionally greater than or equal to about 70°, optionally greater than or equal to about 75°, and in certain variations, greater than or equal to about 80°. In certain variations, an elliptical angle (η) of polarization of a beam of electromagnetic energy after passing through one or more openings in a kirigami-based component according to certain aspects of the present disclosure may be greater than or equal about 20°, optionally greater than or equal to about 25°, optionally greater than or equal to about 30°, and in certain variations, greater than or equal to about 34°.

FIG. 5A shows strain (ε) levels at 0%, 13.5%, and 22.5%. FIG. 5B shows a stretched chiral kirigami metamaterial that is topologically equivalent to a helix structure. FIG. 5C shows a standard right-handed helix structure, where an outside surface is covered with slanted striations and the structure has homeomorphic subsets of a helix.

FIGS. 6A-6H show a structural evolution of a kirigami modulator subjected to tensile stress. FIGS. 6A-6C show optical microscope images of kirigami cut parylene sheets at strain values of 0% (FIG. 6A), 13.5% (FIG. 6B) and 22.5% (FIG. 6C), respectively. A radius of curvature in each opening is shown in FIGS. 6B and 6C, respectively, which increases with increasing strain value. FIGS. 6D and 6E show the top view and side view of stress distribution visualization in FEM, respectively at a strain level of 22.5%. FIGS. 6F and 6H show a top and side view of a kirigami-based component at ε=22.5% strain captured by laser confocal microscopy, respectively. Here, a tilting angle ($θ_{tilt}$) is defined as an angle between x axis and a line parallel to the surface of the kirigami sheet as shown in FIG. 6H. FIG. 6G shows a radius of the cut/opening and tilting angle of the kirigami domain with respect to the strain (%). The radius of the cut edge is varied from almost infinity, i.e., a flat line, to approximately 400 µm round while tilting angle changes from 0° to 45°.

The two dimensional (2D) pattern transforms into an array of alternating convex and concave out-of-plane elements after it is stretched. Generally, chirality comes from breaking this symmetry by out-of-plane deformation due to buckling governed by the Föppl-von Kármán number $$\hat{m} = \frac{-eh}{2mc}(L+gS)\gamma \approx (L/t)^2\gamma \approx (L/t)^2\gamma \approx$$
$$(L/t)^2\gamma \approx (L/t)^2\gamma \approx (L/t)^2\gamma \approx (L/t)^2\gamma \approx (L/t)^2$$

where L is a length of the cut and t is the thickness of parylene sheet. L and t are chosen to be 500 µm and 6 µm, respectively, to achieve $\gamma > 10^4$, which enables strong buckling needed for formation of optical elements with out-of-plane topography.

To obtain circular polarization control, it is necessary for the THz beam to interact with a helical structure. In analogy to a wire grid polarizer, in which a linear array of small wires enables control of linear polarization, the gold herringbone patterns with $D_n$ symmetry are applied to the kirigami-cut surface, such that under the application of strain, the buckled surface will present a wire pattern homeomorphic to a helix to a normally incident THz beam, as illustrated in FIGS. 5A-5D. Stated in another way, the patterned surface is transformed into a homeomorph of a three-dimensional helix. The response of the THz beam to the structure results from a combination of the kirigami-induced surface shape and the wire pattern, in contrast to other implementations of kirigami optics, which have relied only on the shape. Its pitch varies under mechanical strain while its long axis remains aligned with the surface normal (z-axis) and with propagating THz beam. Unlike previous rigid 3D structures, including metallic helices made using different 3D fabrication methods, soft double-patterned kirigami structures enable strong and tunable polarization rotation. Further, the gold patterns on the inventive kirigami-based surfaces can be reconfigured in real time thus providing real time modulation capability.

Therefore, by introducing the secondary pattern (e.g., micropattern) of a plasmonic material to at least one surface of the kirigami-based component, polarization rotation is enhanced while retaining high transmittance in the THz region of wavelengths of electromagnetic radiation. A herringbone pattern of plasmonic material makes the buckled structure topologically equivalent to a helix from a point of view of a beam of light/electromagnetic radiation. After buckling, the kirigami-based sheet component can be viewed as an array of half-cylinder helices covered with slanted striations (FIGS. 5B and 5C). This helical pattern display $D_n$ symmetry whose handedness is determined by the incline of the striation (or stripes) is noting also that the structures from FIGS. 5B and 5C represent homeomorphic subsets because they have the same orientation of striations depending on the concave and convex curvature of the kirigami "flaps," as shown, for example, in FIG. 5D.

FIG. 7 shows an exemplary photolithography process for forming a dual pattern kirigami-based optical component on a sheet of polymeric material in accordance with certain aspects of the present disclosure. First, a planar sheet or substrate comprising a material such as silicon (Si) is provided at (1). Other substrate materials are likewise contemplated, including glasses, metals, polymers, and the like. Next, at (2), a coating of a sacrificial material, such as polymethyl methacrylate (PMMA) is disposed on a surface of the substrate. It should be noted that such a process may be conducted on a multilayered sheet/substrate including at least one polymeric layer. Then, parylene is deposited at (3) onto the sacrificial PMMA coating. It may be deposited at the thicknesses specified above, for example, at 6 µm. Next, at (4), a herringbone pattern of gold and chromium is deposited. The patterned Cr/Au layer is deposited by photolithography and electron beam evaporator. At Step (5), an additional mask layer can be added, for example, a layer of aluminum. Kirigami cuts may be introduced in a predetermined pattern to select regions of parylene through select regions of the mask at (5) via reactive ion etching (RIE). At (7) following the RIE process, the component is soaked in or otherwise contacted with an aluminum etchant solution (wet etch) to remove the aluminum. At (8), the component can be contacted with a solvent to remove the sacrificial layer, such as acetone to remove the PMMA. In this manner, the kirigami-based component is a tunable grating. The grating is defined by a plurality of cuts that form a plurality of bridge structures and a plurality of openings therebetween. The kirigami-based component further has at least one surface that is micropatterned with a plasmonic material, for example, in the herringbone pattern so that the grating component is configured to induce chirality to a beam of electromagnetic radiation as it passes through the plurality of openings.

Various embodiments of the present disclosure can be further understood by the specific examples contained herein. Specific examples are provided for illustrative purposes of how to make and use the compositions, devices, and methods according to the present teachings.

EXAMPLES

Example A

A kirigami modulator device is fabricated as follows. Poly(methyl methacrylate) (PMMA 950 C4, Microchem) is spin-coated (3000 rpm) on a 4 in. silicon wafer as a sacrificial layer and subsequently baked on a 180° hot plate to dry. Parylene C (SCS Inc.) is deposited on the PMMA-coated silicon wafer by a chemical vapor deposition system (PDS 2035CR, SCS Inc.). The thickness of Parylene C is set to approximately 6 µm and confirmed by surface profiler (Dektak XT, Bruker) after deposition. Herringbone patterned thin layers of chromium (approximately 5 nm) and gold (approximately 45 nm) are deposited on the Parylene C using electron beam evaporator (Enerjet evaporator) after a standard photolithography processes (MA/BA6 Mask/Bond aligner, Suss Microtec). Kirigami patterns are generated by additional photolithography on top of a herringbone patterned substrate and followed by deposition of aluminum (approximately 70 nm) as a masking layer for the reactive ion etching process. The corresponding patterns are formed by reactive ion etching (LAM 9400, Lam Research) of Parylene C. Lastly, the entire patterned wafer is soaked in aluminum etchant solution (Aluminum etch Type A, Transene) to remove the aluminum masking layer and in acetone to dissolve the PMMA sacrificial layer. The released kirigami sheet is rinsed carefully with isopropyl alcohol and distilled water and dried.

The dimension of the kirigami cut pattern and definition of slant angle formed by such a method are as follows. The length ($L_{cut}$) and height ($H_{cut}$) of each cut is 500 µm and 5 µm, respectively. The horizontal and vertical spacing's between cuts are set to 100 µm resulting in a horizontal period of 600 µm and a vertical period of 105 µm. A detailed view of a single unit of slanted Au strips is shown in FIG. 3B. The width of each Au strip is set to 5 µm. The width and height of the total domain are 300 and 80 µm, respectively. Here, the slant angle ($\varphi$) is defined as the angle between the cut direction and the longer axial direction of the Au strips, as shown in FIG. 3B. Kirigami samples with four different angles $\varphi$: 15°, 30°, 37.5°, and 45° are tested. FIG. 3C shows a top view of the double pattern kirigami, that is, the kirigami cut pattern together with the Au herringbone pattern. The box indicates the unit cell of the extended modulator structure. The width ($W_{unit}$) and height ($H_{unit}$) of unit cell are 600 and 210 µm, respectively.

Example B

A kirigami-based sheet formed by the techniques in Example A can be integrated into a device with a piezo-controller for the application of controlled strain ($\varepsilon$). A U-521 PI Line (PI instrument) linear position stage is used with a 3D printed sample holder. For a stacked configuration used in TCD measurements, two U-521 piezo controllers are used and manipulated individually. This piezo-controller can be programmed with very high spatial precision of 0.1 µm ($\varepsilon$=0.001%). The applied strain values of 2.3, 4.5, 9.0, 13.5, 18, 22.5% in the measurements is calculated from stretching distances of 0.2, 0.4, 0.8, 1.2, 1.6, 2.0 mm, respectively.

Mechanical characterization of kirigami-based component sheets. The high elasticity and stretchability of kirigami sheets are significant advantages of kirigami chiroptical modulators. This is because a network of notches made in a rigid substrate greatly increases the ultimate strain that can be applied to the sheets and prevents unpredictable local failure. Uniaxial tensile tests are performed by means of a TA.XT plus Texture Analyzer (Texture Technologies) and the Exponent (Texture Technologies) software package for tensile and cycling tests with a 0.5 N load cell at a constant strain rate of 0.2% per second. The engineering stress-strain data are obtained and each curve is averaged over 5 samples. The kirigami modulators prepared in accordance with certain aspects of the present disclosure are found to reach strains as high as 150% without failure (FIG. 4A). Before cutting, the pristine parylene sheets show a strain of 3.8%. In contrast, kirigami cutting significantly modifies the deformation behavior of a film, resulting in a lower stiffness and higher elongation than a pristine sheet, as seen in FIG. 4B. In the stress-strain curves, the kirigami sheet's initial state at <4% strain is elastic in-plane deformation (FIG. 4B, Section I). As the applied stress exceeds a critical strain, the domains of the kirigami structure start to deform elastically in out-of-plane directions. Within this region (FIG. 4B, Section II), buckling occurs as the domains rotate to align with the direction of tensile stress as shown in FIGS. 6A-6H. After that, plastic deformation occurs and finally failure begins when one of the cuts begins to tear and crease (FIG. 4B, Section III). Because only strains up to 22.5% are used to achieve out-of-plane deformations with convex and concave domains, the deformation is completely within the elastic region. FIG. 4C shows the stress-strain curve after 10,000 cycle of stretching and releasing and surprisingly it is nearly identical to its initial curve.

Finite-element modeling for mechanical characterization via commercial finite-element software (COMSOL Multiphysics 5.2a, COMSOL Inc.) is used to explore the strain distribution in kirigami-based sheets prepared in accordance with certain aspects of the present disclosure, which yields insight into the basic mechanisms governing deformation behavior. An approximate global mesh size of 25 μm is used. Boundary conditions on each side of the kirigami sheet are set in the axial direction: 1) at one end, it is fixed and no displacement is allowed to this boundary; 2) at the opposite end, a load in the axial direction is enforced. In real systems, there is always an asymmetrical force, so a very small bias force (approximately $10^{-4}$ times smaller than the load) is applied on a top edge of each cut and then pulled in the axial direction. The FEM shows that high elasticity is due to the even distribution of stress over the kirigami sheet rather than concentrating on singularities (FIGS. 6D and 6E).

Terahertz time-domain spectroscopy (THz-TDS) is used to measure the optical responses of the chiral kirigami modulators formed in accordance with certain aspects of the present disclosure. A Ti:Sapphire regenerative amplifier (RegA 9050, Coherent) with a center wavelength of 800 nm, a pulse duration of approximately 80 fs and a repetition rate of 250 kHz excites a THz photoconductive (PC) emitter (Tera-SED10, Laser Quantum) and the generated THz rays are collimated by an off-axis parabolic mirror onto the kirigami-based structures at normal incidence. The spot size of the THz beam is controlled by an iris diaphragm to a diameter of approximately 2 cm to ensure only THz waves passing through the kirigami-based modulator structure are measured. The transmitted beam is focused by another set of parabolic mirrors and detected by a 1 mm thick (110)-oriented ZnTe crystal with the method of electro-optic (EO) sampling.

The following method utilizing two linear polarizers is used to determine the orientation and ellipticity of arbitrarily polarized THz waves. Two THz wire grid polarizers (G50× 20-L, Microtech Instruments, Inc., designated first polarizer (P1) and second polarizer (P2)) with an extinction ratio of $10^3$-$10^4$ in the spectral range 0.1-3 THz are used in the configuration shown in FIG. 8A. The THz fields generated by the PC emitter are measured to have a high degree of linear polarization with an ellipticity angle below 0.3°, which is negligible compared to the ellipticity induced by the chiral kirigami modulator. It is confirmed that use of a linear polarizer immediately after the emitter made no further improvement in linearity. The emitter is fixed at an orientation such that the generated THz polarization is horizontal to the optical table (defined here as the x axis). The first polarizer (P1) was placed in front of the ZnTe crystal and its transmission direction (perpendicular to the wire grid orientation) is fixed vertical to the optical table (defined as they axis). The ZnTe crystal and the sampling pulses are also oriented to give the maximum electro-optic sensitivity along y direction. The second polarizer (P2) is placed between the sample and the first polarizer and is rotated to different orientations to determine the complete polarization state of the transmitted field.

When the P2 transmission axis is along they direction (defined as 0°), is aligned with P1 and the component of the transmitted waves through sample $E_y(t)$ is measured. The x-component $E_x(t)$ is measured by rotating the orientation of P2 to +45° and −45° and calculated by the subtraction of the two. Since any arbitrary electric field can be decomposed into two perpendicular components, polarization states such as ellipticity and polarization rotation angle can be fully determined with three measurements. The electric field from the PC emitter without samples is also measured using the same method for calculating the reference transmission coefficients.

Because the kirigami-cut pattern used in certain variations of the present disclosure does not have C4 symmetry, measurements are performed for two perpendicular polarizations, i.e. horizontally and vertically polarized THz waves, incident on the kirigami-cut sheet component to fully characterize the kirigami-based component's in-plane optical properties, especially for circular dichroism. This is accomplished by rotating the kirigami structure by 90° instead of rotating the THz emitter, which would have required elaborate rotations of two polarizers as well as the ZnTe crystal and the sampling beam. The kirigami-based modulator is attached to a rotation mount (RSP1, Thorlabs), so the transmitted waves can be measured in both horizontal and vertical orientations (simple rotation by 90°). Here, the horizontal and vertical mounting orientations are defined as follows: (1) horizontal—stretching direction is along with x direction as indicated in FIG. 8B and (2) vertical—stretching direction is along with y direction in FIG. 8C.

Confocal laser microscope images (FIGS. 6A-6H) of double-pattern kirigami-based components prepared in accordance with certain aspects of the present disclosure obtained for strains e from 0% to 22.5% confirm the controllable clock- and anticlockwise screw geometry along with z-axis, and that the buckling and tilting of each segment occurred simultaneously for the entire sheet as required for uniform polarization control of a beam. The reconstructed contour maps of left-handed (L-) and right-handed (R-) kirigami-based structures (FIG. 9B and FIGS. 6A-6H) at ε=22.5% strain indicate that the edges of the buckled elements extended to 68 μm symmetrically along the positive and negative z-axis, controlling the radius of the half-helices and the oblique angles that are the two key factors controlling optical rotation of the THz beam. More specifically, tuning the radius and pitch of the clockwise and counter clockwise half-helices are two key factors for controlling electrodynamic interactions of the these structures with left and right circularly polarized photons. The experimental deformations matched the predictions from finite-element modeling exactly (FIGS. 6A and 6D).

The chiroptical performance of kirigami modulators is measured using THz time-domain spectroscopy (THz-TDS) over the range 0.2-2 THz. The state of a polarized beam may be completely characterized by the polarization rotation angle, θ, and ellipticity angle η. Because the polarization of the incident THz beam is linear and horizontal, the sample-induced polarization rotation angle θ and ellipticity angle η can be calculated directly by the measured THz spectra of $$\tilde{E}_s = \begin{pmatrix} \tilde{E}_x \\ \tilde{E}_y \end{pmatrix}$$

using Stokes parameters, and the same equations can be applied for both the horizontal and vertical orientations of mounting. The four Stokes parameters are defined as $S_0 = \tilde{E}_x\tilde{E}_x^* + \tilde{E}_y\tilde{E}_y^*$ $S_1 = \tilde{E}_x\tilde{E}_x^* - \tilde{E}_y\tilde{E}_y^*$ $S_2 = \tilde{E}_x\tilde{E}_y^* + \tilde{E}_y\tilde{E}_x^*$ $S_3 = i(\tilde{E}_x\tilde{E}_y^* - \tilde{E}_y\tilde{E}_x^*)$ Since THz-TDS measures the electric field directly, three measurements (one for $\tilde{E}_y$ and two for $\tilde{E}_x$) determine the four Stokes parameters and thus the polarization state. The polarization rotation angle θ relative to the horizontal direction and the ellipticity η can be calculated using Stokes parameters as follow:

$$\theta = \frac{1}{2}\tan^{-1}\left(\frac{S_2}{S_1}\right), -\frac{\pi}{2} \leq \theta \leq \frac{\pi}{2}$$

$$\eta = \frac{1}{2}\sin^{-1}\left(\frac{S_3}{S_0}\right), -\frac{\pi}{4} \leq \eta \leq \frac{\pi}{4}$$

Additional care should be taken for the rotation angle θ, because mathematically the range of the inverse tangent function $\tan^{-1}(x)$ is $$\left[-\frac{\pi}{2}, \frac{\pi}{2}\right]$$

and correspondingly the range of θ would be $$\left[-\frac{\pi}{4}, \frac{\pi}{4}\right].$$

In optics, however, the rotation angle θ is within the range of $$\left[-\frac{\pi}{2}, \frac{\pi}{2}\right].$$

The polarization state of the THz beam is determined using two complementary methods: one was based on standard calculations of Stokes parameters from the Jones matrix from a sequence of linear polarization measurements, while the second was based on direct measurements employing the kirigami-based modulator.

FIGS. 9A-9H show THz-TDS measurement of a chiral kirigami-based modulator prepared in accordance with certain aspects of the present disclosure. In FIG. 9A, a kirigami-based grating component sheets are mounted on a 3D printed rotatable optical holder and controllable stress was applied with a piezoelectric controller. Thus, controllable stress is applied with a programmable piezoactuator with a precision of 100 nm (ε=0.001%). FIGS. 9C, 9E, and 9G are results of polarization rotation angle of kirigami-based components prepared in accordance with certain aspects of the present disclosure having slanted Au angles (φ) of 15, 30, 45 degree with respect to strain (%), respectively. FIGS. 9D, 9F, and 9H show results of consequent ellipticity angle of kirigami-based components prepared in accordance with certain aspects of the present disclosure having slanted Au angles (φ) of 15, 30, 45 degree with respect to various strain levels, respectively. There is an approximately 0.2 THz increment per 15° change of φ. As can be expected by the Bohn-Kuhn model for chiral medium and conditions for Kramers-Kronig relation, the ellipticity exhibits a dispersive curve and crossed zero at slightly off-resonance frequencies, where the polarization rotation showed maximum. Inset shows optical microscope images of each kirigami samples. Scale bar in FIG. 9D is 100 μm.

The measured polarization angles θ and η are shown in FIGS. 9C-9H; as expected θ and θ increase with strain and kirigami-based structures with left-handed and right-handed herringbone patterns exhibit THz responses that are nearly identical but with opposite signs. The inclination angle (φ) of the herringbone patterns (insets of FIGS. 9D, 9F, and 9H) determine the position of the main resonance peaks, which are observed at 0.41 THz for φ=15°, 0.62 THz for φ=30° and 0.81 THz for φ=45°. The maximum values of θ and η reach as high as 80° and 34°, respectively, and are obtained for herringbone patterns with φ of 30°. This maximum ellipticity value is almost close to that of quarter-waveplate. Note that the magnitudes of θ and η can be different depending on the in-plane rotation angles due to birefringence, which is taken into account in the TCD spectra. As a control, an achiral pattern with horizontally aligned (φ=0°) Au strips is tested, and showed near-zero values of θ and η regardless of the strain, confirming the critical role of the double-pattern design for the strong optical activity. Polarization modulations with nearly identical values of θ and η were obtained for 1000 cycles with ε between 0% and 22.5%.

The effect of the microscale cut pattern on the optical performance of the kirigami polarization modulators is tested for variable size of the unit cell for a constant inclination φ=30° of the metallic striped pattern. As $L_{cut}$ becomes larger, the main TCD peak shifts to the red (FIGS. 10A-10B), indicating that its spectral position is determined by the longitudinal plasmonic resonances of the Au strips. TCD spectra of kirigami modulators with Au strips having same length and φ, but narrower width, display the same position of resonance peak and similar overall shape, confirming this conclusion. The resonance wavelength of the optical response of parallel metal strips in the kirigami sheets with herringbone patterns can be obtained by modeling the structure as an LC circuit with the resonance frequency of $f_r=(2\pi\sqrt{L_{Au}C_{Au}})^{-1}$ (34). The inductance $L_{Au}$ and capacitance $C_{Au}$ of Au strips scale linearly with its length, l (FIG. 10C), and therefore $f_r$ becomes inversely proportional to l (FIG. 10D). Alternatively, the metal strips can also be approximated as Hertzian dipoles bent and tilted in 3D space, $l\sim\lambda_r/4=c/4f_r$, where c and $\lambda_r$ are the speed of light and resonance wavelength. This equation can be used to provide an approximate guide of the design of herringbone patterns for different applications.

TCD spectra of the kirigami optical components can be predicted with ab ovo electrodynamic simulations. Since the parylene substrate is very thin and shows low loss tangent over the THz range without chirooptical activity, this is omitted from the calculation model. Computed TCD spectra (FIG. 11A) match well the experimental data with respect to the signs of the polarization rotation angle, peak positions, relative peak widths and amplitudes (FIG. 9H). Calculated time-averaged current norm distributions generated on the Au strips for the incident of the circularly polarized beam point to the origin of the plasmonic states responsible for individual peaks are shown in FIGS. 11A-11D. At the off-resonant frequency of 0.57 THz, the induced currents are low for both co- and cross-circularly polarized beam and most of the Au strips are optically inactive (FIG. 11B). At the resonant frequency of 0.82 THz, however, the incident beam induces strong currents in the Au strips. Simultaneously, the currents excited by the right-handed circularly polarized beam significantly exceed those for left circularly polarized beam (FIGS. 11C and 11D). As a result, the transmittance of the left circularly polarized beam is larger than that of the right circularly polarized beam due to the induced current, which is consistent with the sign of the peaks in 11A. On the other hand, strong secondary peaks around 1.05 THz and 1.15 THz are found and could come from electromagnetic coupling between adjacent strips.

The unique combination of high ellipticity and tunability of the kirigami half-helices makes possible utilization of kirigami optics for modulating THz light beams in practical realizations of TCD spectroscopy to investigate biological and other materials that are opaque in the visible range but transparent for THz radiation. To demonstrate this capability, TCD spectra of several representative biological samples are measured (FIG. 12A), including a leaf of sugar maple tree (*Acer saccharum*), an elytron of green beetle (*Chrysina gloriosa*), a petal of dandelion (*Taraxacum officinale*) and a piece of pig fat. The kirigami modulators function similarly to photoelastic modulators (PEMs) in conventional circular dichroism spectrometers by generating left- and right-elliptically/circularly polarized light. In FIG. 12A, the kirigami-based modulator formed in accordance with certain aspects of the present disclosure is used in a spectroscopy system that includes an emitter that generates a linearly polarized beam of electromagnetic energy directed towards the kirigami-based modulator. After the linearly polarized beam passes through one or more openings in the kirigami-based modulator, the beam is an elliptically polarized beam (EPB). The beam is then directed towards a biological sample and then received by a detector.

Here, TCD spectra are calculated directly from a difference of transmission-intensity between left and right elliptically polarized THz beam (EPB) generated by kirigami modulators according to Eq. 1:

$$TCD \text{ by kirigami modulator} = \tan^{-1}\left(\frac{I_{LK}^{1/2} - I_{RK}^{1/2}}{I_{LK}^{1/2} + I_{RK}^{1/2}}\right)$$

where, $I_{LK}$ and $I_{RK}$ are the intensities of the left and right EPB after passing through the sample, respectively. Distinct THz spectra are observed from the tested biomaterials that can be associated with low energy vibrational modes of their biological components and with chiral structural organization. In both cases, the opaqueness of biomaterial and mismatch in energy/wavelengths with visible light would not allow chiral characterization by ECD or VCD spectroscopy. An exemplary case is the transmissive TCD measurements of an elytron of *C. gloriosa* beetle (FIGS. 12B and 12C), which is known to have the selective reflection of circularly polarized visible A positive peak of TCD (FIG. 12G) as large as 3° at 0.68 THz is observed in the red circled area in FIG. 12F. Notably, the absorption peak of this biological composite (FIG. 12H) is well aligned with that of TCD peak. This TCD spectrum is associated with the chirality of its micro structure of exocuticle (FIG. 12D), which shows chiroptical response in reflected light in visible range (FIG. 12E).

Thus, the present disclosure contemplates kirigami-based components for optical devices that have a double-pattern design, including submillimeter kirigami cuts and nanometer scale plasmonic stripes, thus affording real-time tunability of helical structures oriented perpendicularly to the propagation of the light beam. Kirigami optical elements make possible realization of TCD spectroscopy and better understanding of liquid-crystal-like organization of soft and mineralized tissues as well as bioinspired materials. The lightweight capabilities and high polarization efficiency of kirigami-based optics open a possibility of compact THz spectrometers. The realization of real-time polarization modulation of THz beams also enable advances in secure high bandwidth communication and non-invasive imaging.

Furthermore, the unique combination of high ellipticity and high elasticity in chiroptical kirigami-based pattern also makes possible its use as a photoelastic modulator. Thus, one kirigami-based component is employed as a chiroptical modulator (first kirigami) and the other (second kirigami) as a tunable sample. Dynamic modulations of the two chiral kirigami may be applied independently, which translates into individual manipulations of ellipticity of the input beam (from linear to elliptical) and the chiroptical activity of the sample (from achiral to chiral). The first kirigami-based modulator generates left- or right-elliptical/circular polarization beams similar to a photoelastic modulator (PEM) in a conventional CD spectrometer, and the second kirigami can be considered as the sample to be probed.

Thus, a double-stacked kirigami-based component configuration is used in one embodiment shown in FIG. 13A, namely the optical device includes a plurality of kirigami-based components. More specifically, in the embodiment shown in FIG. 13A, the optical device includes an emitter that generates a linearly polarized beam of light directed to a first kirigami-based grating component. After the beam passes through one or more openings in the kirigami-based grating component, it is elliptically polarized in a first direction. The beam then passes to and through a second kirigami-based grating component and is then polarized in a second direction (as an elliptically polarized beam of light). A detector then receives the modified beam after it has passed through the second kirigami-based grating device. This optical device obtains a TCD spectrum of the static kirigami-based component using modulation of another kirigami (FIGS. 13B and 13C). A TCD spectrum of the sample kirigami ($2^{nd}$ kirigami) is measured by kirigami modulator ($1^{st}$ kirigami) two times in the experiment: the first measurement of transmittance is obtained by L kirigami (LK) for introducing left elliptically polarized light (EPL) to the second/sample kirigami-based modulator. For the second measurement, R kirigami (RK) is used instead of L for generating right EPL.

TCD is calculated from intensity difference between left and right EPL as given below:

$$TCD = \tan^{-1}\left(\frac{I_{LK}^{1/2} - I_{RK}^{1/2}}{I_{LK}^{1/2} + I_{RK}^{1/2}}\right)$$

where, $I_{LK}$ and $I_{RK}$ are the intensities of the transmitted waves through the sample (second kirigami) of the EPL generated by LK and RK, respectively. The result of TCD spectrum (FIG. 13C) measured by kirigami modulator is almost same as that of conventional two polarizer measurement. Two kirigami modulators are then stacked along the collimated THz propagation (i.e. z) direction, with a separation of approximately 2 cm and actuated by two independent piezo-controllers from 0% to 18% strains. It should be noted that although the kirigami-based modulator generates about 20° elliptically polarized light instead of ideal 45°, it can still measure TCD accurately. Interestingly, the sign of peak around 0.95 THz is reversed. This is because in the TCD equation, it is assumed that L-kirigami generates only left EPL and the other way around. However, L-kirigami shows a positive ellipticity (left EPL) value below approximately 0.8 THz and then sign is flipped making right EPL. Thus, this sign reversal can be explained by the fact that the kirigami-based chiroptical modulator is dependent on the frequency. Because only the transmittance, instead of electric field vectors, is needed to measure, chiral kirigami-based modulators provide additional applications beyond THz-TDS, such as integration with Fourier-transform infrared spectroscopy (FTIR) for vibrational CD (VCD) measurement and THz camera for real-time polarization sensitive two-dimensional imagers.

For the device including a double stacked kirigami-based modulator TCD system, other potential applications using kirigami chiroptical modulators are also envisioned. FIGS. 13D and 13E show the total ellipticity of stacked kirigami-based components at the resonance frequency of 0.73 THz, which is expressed as 5×5 matrix for a set of five c preset values for each sheet. When two kirigami-based components of opposite handedness are stacked, they compensate for each other. FIG. 13D. By making the rotatory power of one of them smaller, it becomes possible to dynamically switch the sign of the modulation from positive to negative, which is indispensable for any chiroptical spectroscopies. Furthermore, especially for same c for both of kirigami-based components, the principal diagonal in the matrix shows almost zero. This diagonal matrix can thus be used for secure THz communication. Well-known are methods for encrypting data using codes where only a receiver with the right key can decode and recognize the information. Uniquely, the kirigami-based chiroptical modulator can be used for encrypting the wave front and only chirally complementary kirigami-based modulators can decrypt it back, so as to read its original phase and amplitude (the data).

On the other hand, when both of kirigami-based components prepared in accordance with certain aspects of the present disclosure have the same handedness, an ellipticity angle is additive (FIG. 13E). Since the kirigami-based component is transparent in the THz range, many kirigami-based components can be stacked by design to achieve a wave plate-like modulator. Although the summation process is non-linear, 90° polarization rotation and 45° ellipticity angle can be obtained by choosing an appropriate set of two kirigami-based modulators.

Kirigami chiroptical modulators with 37.5° slant angle are thus used to characterize and demonstrate the effects of stacking two kirigami layers on the polarization states. Each individual modulator is measured separately using the two-polarizer method described above. From these data, circular dichroism spectra for left- (L) and right- (R) handed samples are calculated.

There are four possible configurations for the measurements: the kirigami-based modulator may be designed for either right- or left-handedness, and the modulators may be mounted horizontally or vertically relative to the input linear polarization. The abbreviation used herein is as follows: "HL" for horizontally mounted left-handed kirigami modulator, "HR" for horizontally right-handed, "VL" for vertically left-handed, and "VR" for vertically right-handed.

Two kirigami modulators are then stacked along the collimated THz propagation (i.e., z) direction, with a separation of about 2 cm and actuated by two independent piezo-controllers from 0% to 18% strains, as shown by the schematic of the experimental setup in FIG. 14. A second kirigami-based sheet is inserted behind a first kirigami-based sheet to form a double stack configuration and each is independently controlled by two piezo-controllers. The configuration of the two kirigami-based sheets shown is that the first kirigami-based sheet being mounted vertically and the second kirigami-based sheet being mounted horizontally.

Four combinations of two samples (i.e., VL and HL, VR and HL, VL and HR, VR and HR) are measured and the total effects on the rotation and ellipticity of the polarization determined. These four combinations are chosen to show the enhancement of optical activity by stacking kirigami with the same chirality and compensation by stacking kirigami with opposite chirality. This measurement also validates the use of kirigami modulators for THz circular dichroism spectroscopy. It turns out that if the mounting orientations for the two kirigami modulators are perpendicular, in other words, that the first kirigami-based component is oriented vertically (V) and the second kirigami-based component is mounted horizontally (H), the birefringence cancels. This is an important requirement for the combinations of modulators with opposite chirality to compensate both optical activity and birefringence. For each combination, there are 25 modulations achieved by 5 different strains applied to each kirigami independently.

The results indicate that a chirality-switchable modulator is achieved by stacking kirigami-based modulators with opposite handedness. Moreover, it is only when the strains applied to the two layers are the same that the output polarization state is the same as the input, i.e. zero polarization rotation and zero ellipticity. The small non-zero values at these strains in the experimental results came from the imperfect matching and alignment between the two samples, but this can be improved by careful control of samples or by additional calibration methods. In general, the experimental results closely match theoretical results and thus provide the potential to be developed as a modulator for other applications such as secure THz communication and handedness-switchable devices.

The results of stacking kirigami modulators with the same chirality indicate that adding polarization rotation and ellipticity can be achieved. The magnitudes are larger than for a single kirigami for all strain conditions except ε=0%. This shows the possibility that ideal 90° rotation angle and 45° ellipticity could be achieved by stacking more kirigami layers or using kirigami with parameters accurately designed for specific frequency.

To demonstrate TCD of a kirigami-based sample using a kirigami-based modulator, a double stacked kirigami (φ of 37.5°) configuration in FIG. 14 has one kirigami-based component as a chiroptical modulator (first kirigami) and the other kirigami-based component (second kirigami) as a tunable sample. Dynamic modulations of the two chiral kirigami-based components are applied independently, which translates into individual manipulations of ellipticity of the input beam (from linear to elliptical) and the chiroptical activity of the sample (from achiral to chiral). The first kirigami modulator generates left- or right-elliptical/circular polarization beams similar to a photoelastic modulator (PEM) in a conventional CD spectrometer, and the second kirigami can be considered as the sample to be probed.

To avoid confusion with the previously defined TCD angle, which is calculated using ideal circular polarization deduced from the experimental linear polarization measurements, the TCD directly obtained by kirigami modulation is measured directly from the elliptically polarized beam generated by first kirigami-based component. Because the elliptically polarized beam generated by a first kirigami is frequency dependent, the TCD angle is defined similarly to that above, but slightly modified to:

$$\text{TCD by kirigami modulator} = \tan^{-1}\left(\frac{E_{LK} - E_{RK}}{E_{LK} + E_{RK}}\right) = \tan^{-1}\left(\frac{I_{LK}^{1/2} - I_{RK}^{1/2}}{I_{LK}^{1/2} + I_{RK}^{1/2}}\right)$$

where $E_{LK}$ and $E_{RK}$ are the electric field magnitudes of the transmitted waves through the kirigami sample (the second kirigami-based component in this case) of the elliptically polarized beam generated by the first kirigami-based sheet, which may be left-handed kirigami (L) or right-handed kirigami (R), respectively. $I_{LK}$ and $I_{RK}$ are the corresponding transmittance-intensities.

The transmittance-intensities are obtained and normalized to that of ε=0%, which is with no strain applied to the kirigami-based modulators. The transmittance-intensities of ε=0% is used as base to eliminate the inherent difference caused by any slight mismatch of L- and R-elliptically polarized beams. Because the modulation of the two chiral kirigami-based structures can be manipulated independently, the measurement of TCD can be tested by manipulating both the ellipticity of the input polarization from linear to 20° elliptical and the chiroptical activity of sample to be probed from achiral to chiral. The experimental data of TCD spectra of L- and R-kirigami samples with 5 strain conditions, for 5 different input elliptical polarizations are examined. When the strain applied on the second kirigami-based component increases, the measured TCD also increases, just as for the results in single kirigami-based component measurements. The measured TCD increases as the ellipticity of the input beam became larger because the intensity difference between the incident left- and right-elliptically polarized beams is increased.

Validation of this method is performed by comparing this TCD measured by kirigami-based modulator with TCD measured by standard two polarizers method. This TCD measurement on sample kirigami sheets demonstrates the use of this method for vibrational CD (VCD) measurements of chiral bio-molecular samples. It should also be emphasized that since only the intensities, instead of electric field components, are needed, compared to the method using two polarizers mentioned previously, this TCD spectroscopic method with chiral kirigami modulators provides more generalized applications beyond THz-TDS such as integration with conventional Fourier-transform infrared spectroscopy (FTIR) for vibrational CD (VCD) measurement and THz camera for real-time polarization resolved 2D images.

FIG. 15 is a schematic of a tunable optic device having two distinct tunable kirigami-based grating components prepared according to certain aspects of the present disclosure capable of functioning as a TCD spectrometer for a biological sample. An elliptically/circularly polarized THz beam generated by a kirigami-based modulator is focused by an off-axis parabolic gold mirror to a spot size of approximately 500 μm and acts as the input for the biological sample(s) to be analyzed. The transmitted THz beam travels through the sample and is collected and collimated by another off-axis parabolic gold mirror for detection. To further demonstrate the application of kirigami chiroptical modulators for TCD measurements of biological samples, TCD spectra of the elytron of a June beetle, a petal of a dandelion flower, a leaf of a maple tree and a piece of pig fat is measured. Due to the small size of some biological samples, a focused THz beam with an approximate 500 μm spot size is used in the experimental setup/device shown in FIG. 15. The entire setup is enclosed in a box purged by extra-dry nitrogen and the relative humidity is maintained below 3% to minimize the water vapor absorption and to maximize the measurement sensitivity. The kirigami chiroptical modulators with 37.5° slant angle are used to generate left- and right-handed elliptically polarized beams.

FIGS. 16A-16D show the results. In FIG. 16A, a reference, with no biological sample in place, shows near zero TCD indicating the intensity transmissions of the two kirigami-based modulators are almost the same. FIG. 16B shows a sample of a maple leaf with a very small chiroptical response with slightly noisier curves, which mainly could come from the lower signal-to-noise ratio caused by the THz absorption by the leaf. FIG. 16C shows the sample of pig fat, which also shows negligible TCD. FIG. 16D shows a petal of a dandelion flower having TCD signals between 0.3-0.8 THz with negative value and with a TCD that increases as the input ellipticity gets larger. The measured absorption coefficient of a dandelion shows that the absorption frequency range matches closely the TCD spectrum. The observed absorption in this frequency (0.3 to approximately 0.8 THz) is different from that of the other biosamples, which may indicate that THz-active chemical constituents are likely different. Although the possibility that TCD arises from the physical micro-structure of a petal cannot be ruled out, consistent chiral motifs are not observed in scanning electron microscope images of the sample. Rather, chemical constituents of a dandelion, such as caffeic acid, chlorogenic acid, chicoric acid, chrysoeriol and β-carotene are likely to have a substantive contribution, noting that the spectral positions of the TCD bands and those of absorption overlap the several vibration modes of caffeic acid (0.58 THz for monomer and 0.67 THz for dimer), chlorogenic acid (0.41, 0.53, 0.7 and 0.9 THz) and β-carotene (broad band from 0.25 to 2 THz). As shown here, characterizing the chirality of matter through kirigami-based TCD spectroscopy in accordance with certain aspects of the present disclosure is a starting point for further studying of biological microstructure as well as a variety of biomolecules such as proteins and nucleic acids.

Here, the measured transmittance, $$T = \frac{I_{sam}(\omega)}{I_{ref}(\omega)} = \frac{(E_{sam}(\omega))^2}{(E_{ref}(\omega))^2},$$

is obtained from the THz transmittance through a sample attached to an aperture, $I_{sam}(\omega)=(E_{sam}(\omega))^2$, divided by the THz transmittance through the void aperture, $I_{ref}(\omega)=(E_{ref}(\omega))^2$. The absorption coefficient (α) is calculated by $$\alpha(\omega) = -\frac{2}{d_s}\ln(T)$$

where $d_s$ is the thickness of the sample.

The devices provided by certain aspects of the present disclosure make it possible to control chiral topology with kirigami-based mechanics, which can be extended to multiple length scales and material classes. The double-pattern design of optical elements provided by the present teachings affords a unique set of optical materials with real-time tenability of helical variables such as pitches, inclination angles and number of turns. Arrays of tunable 3D helices driven by electro-mechanical force can be readily made. Real-time modulation of the polarization rotation over thousands of cycles may find significant use in novel functional devices such as negative refractive index media, vibrational circular dichroism and chiral secure THz communication. The chiral topology based on kirigami-cut structures is not limited to THz range; rather it is potentially applicable to a wide range of other electromagnetic wave as a universal way.

In certain variations, a tunable optic device comprising a tunable kirigami-based grating capable of transmitting and inducing or modulating a beam of electromagnetic radiation can be used in a Light Imaging, Detection, And Ranging (LIDAR) system or for biomedical imaging. LIDAR is a surveying method that measures distance to an object by illuminating the object with a pulsed laser light, and measuring the reflected pulses with a sensor. Differences in laser return times and wavelengths can then be used to make digital 3D-representations of the detected object. More specifically, LIDAR systems generally include a laser source that produces a pulse of polarized or unpolarized light at a specific wavelength. When the light is first emitted, a time-of-flight sensor records the initial time. The time-of-flight is used to determine the total distance the light travels from source to detector by using the speed at which light travels. LIDAR may be used to produce high-resolution maps, with applications in geodesy, geomatics, archaeology, geography, geology, geomorphology, seismology, forestry, atmospheric physics, laser guidance, airborne laser swath mapping (ALSM), and laser altimetry. LIDAR technology may also be used for the control and navigation of autonomous vehicles.

In certain aspects, a LIDAR system may include a laser configured to generate a light pulse, a beam steerer configured to produce a polarization-adjusted light pulse emitted towards an object, at least one polarizer configured to polarize reflected, scattered, or emitted light returned from the object, and a processor configured to detect at least one material of the object based on an intensity and polarization of the polarized reflected, scattered or emitted light from the object. Such systems are described in International PCT Publication No. WO 2019/139656 to Kotov et al. entitled "MATERIAL-SENSING LIGHT IMAGING, DETECTION, AND RANGING (LIDAR) SYSTEMS," the relevant portions of which are incorporated herein by reference. The beam steerer and/or the at least one polarizer may comprise a tunable optic device comprising a tunable kirigami-based grating. Notably, other components may be present in the LIDAR system, as appreciated by those of skill in the art.

In certain other variations, a tunable optic device comprising a tunable kirigami-based grating capable of transmitting and inducing or modulating a beam of electromagnetic radiation can be used in various biomedical applications, such as a biomedical imaging device, by way of example. Examples of such devices include the previously described THz circular dichroism (TCD) tunable optic devices. In certain biomedical imaging devices, an unpolarized electromagnetic beam (e.g., a THz beam) is directed towards a tissue sample, a target component, or target area of a patient's body to illuminate the target tissue or region with an unpolarized electromagnetic beam (e.g., a THz beam). THz photons may be altered by the interaction with the tissue sample, target component, or target region of the patient's body. The THz photons may then be imaged by an imaging component and analyzed (e.g., by a processor or computing device) for circularly polarized THz components that served as contrast for detection of abnormal areas of the image's area. By way of non-limiting example, examples of various biomedical imagining systems incorporating tunable optic kirigami devices prepared in accordance with certain aspects of the present disclosure were described above in the context of FIGS. 8A, 12A, 13A, 14 and 15. In this manner, biomedical THz imaging systems can be used to identify and diagnose malignant or diseased cells in a target sample. Notably, other components may be present in the biomedical imaging system, as appreciated by those of skill in the art.

In other variations, a kirigami-based component can be used as a chiroptical modulator and may generate a circularly polarized electromagnetic beam may be directed towards the tissue sample, target component, or target area of a patient's body for illumination of the area of interest. The circularly polarized beam may be a circularly polarized THz beam. In one aspect, THz imaging systems using circular polarization, including use of the tunable optic devices prepared in accordance with the present disclosure, can analyze fluid movement in a patient's body. For example, fluid movement in blood vessels can be monitored with the contrast originating from the alteration of polarization of THz by the liquid flow.

In yet other variations, a kirigami-based component can be used as a chiroptical modulator and may generate a linearly polarized electromagnetic beam may be directed towards the tissue sample or target area of a patient's body for illumination of the area of interest. The linearly polarized beam may be a linearly polarized THz beam.

In yet further variations, an electromagnetic beam may be a monochromatic THz beam directed towards the tissue sample or target area of a patient's body for illumination of the area of interest, where photons are altered by interaction by the tissue or body region and then analyzed for their spectral distribution. In other variations, an electromagnetic beam may be a broadband THz beam directed towards the tissue sample or target area of a patient's body for illumination of the area of interest, where photons are altered by interaction by the tissue or body region and then analyzed for their spectral distribution.

If a target component of the imaging system has been implanted or is a wearable microfluidic device, THz imaging can be used to evaluate the flow and status of the microfluidic devices. THz imaging systems can thus be used for the detection of the status, functionality, surrounding tissues for the body implants, implanted sensors, wearable devices, medical tattoos, skin-like electronics, and the like.

Similarly, the biomedical THz imaging systems can evaluate wounds, cuts, burns, lesions, abscesses, biofilms, epithelial damage, cancer, infections circulation problems, and the like. Such imaging can be used to evaluate target regions under medical dressings, bandages, compresses, covers, casts, and the like without requiring any disturbing or removing of the overlying protective materials. Similarly, the biomedical THz imaging systems can evaluate regions beneath nails, teeth, hair, fat, callouses, scar tissue, mineralized areas, and the like.

In certain other variations, the biomedical imaging device that employs THz imaging systems in accordance with certain aspects of the present disclosure may be placed on a probe for imaging and analysis of remote areas of patient's body, such as an oral cavity, a nasal cavity, colon, vagina, urethra, esophagus, stomach, and the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A kirigami-based optic device comprising:
a tunable kirigami-based component comprising a plurality of bridge structures and a plurality of openings therebetween, wherein at least one surface of the tunable kirigami-based component has a micropattern comprising a plasmonic material so that the tunable kirigami-based component is configured to induce or modulate rotational polarity of a beam of electromagnetic radiation as it passes through the plurality of openings.

2. The kirigami-based optic device of claim 1, wherein the plasmonic material is selected from the group consisting of gold (Au), alloys of gold (Au), silver (Ag), alloys of silver (Ag), copper (Cu), alloys of copper (Cu), aluminum (Al) and alloys of aluminum (Al), cadmium tellurium (CdTe), indium tin oxide (ITO), tungsten trioxide ($WO_3$), molybdenum trioxide ($MoO_3$), graphene, carbon dots, carbon ribbons, and combinations thereof.

3. The kirigami-based optic device of claim 1, wherein the plasmonic material comprises gold.

4. The kirigami-based optic device of claim 1, wherein the tunable kirigami-based component exhibits a polarization rotation angle ($\theta$) of greater than or equal to about 75°.

5. The kirigami-based optic device of claim 1, wherein the tunable kirigami-based component exhibits a polarization rotation angle ($\theta$) of greater than or equal to about 75° after greater than or equal to about 10,000 cycles of stretching and relaxation.

6. The kirigami-based optic device of claim 1, wherein the tunable kirigami-based component exhibits an elliptical angle ($\eta$) of polarization of greater than or equal to about 30°.

7. The kirigami-based optic device of claim 1, wherein the beam of electromagnetic radiation is in a terahertz (THz) range having a photon wavelength of from about 0.1 mm to about 1 mm and energy of from about 0.001 eV to about 0.01 eV.

8. The kirigami-based optic device of claim 1, wherein the plurality of openings are defined by a first row of at least two discontinuous cuts extending from a first surface to an opposite second surface of the tunable kirigami-based component and a second row of at least two discontinuous cuts extending from the first surface to the opposite second surface of the tunable kirigami-based component, wherein the first row and the second row cooperate to form a plurality of bridge structures that create an array of alternating convex and concave out-of-plane elements.

9. The kirigami-based optic device of claim 1, wherein the micropattern comprises a plurality of stripes of the plasmonic material, where in a portion of the plurality of stripes are spaced apart from one another and are substantially parallel to one another.

10. The kirigami-based optic device of claim 9, wherein the plurality of stripes has an average width of greater than or equal to about 1 μm to less than or equal to about 10 μm and an average space between respective stripes is greater than or equal to about 5 μm to less than or equal to about 15 μm.

11. The kirigami-based optic device of claim 1, wherein the micropattern comprises a plurality of stripes of the plasmonic material defining a herringbone pattern.

12. The kirigami-based optic device of claim 1, wherein the plurality of openings are defined by a first row of at least two discontinuous cuts and the micropattern comprises a plurality of stripes defining an inclination angle ($\varphi$) with respect to the first row of greater than or equal to about 15° to less than or equal to about 45°.

13. A tunable optic device comprising:
a tunable kirigami-based grating capable of transmitting and inducing or modulating rotational polarity of a beam of electromagnetic radiation, wherein the tunable kirigami-based grating comprises a plurality of bridge structures and a plurality of openings therebetween and at least one surface of the tunable kirigami-based grating has a micropattern comprising a plasmonic material so that the tunable kirigami-based grating is configured to induce or modulate rotational polarity of a beam of electromagnetic radiation as it passes through the plurality of openings; and
a tensioning component attached to the tunable kirigami-based grating that reversibly stretches the tunable kirigami-based grating in at least one direction, thereby modifying the beam of electromagnetic radiation as it is transmitted through the plurality of openings in the tunable kirigami-based grating.

14. The tunable optic device of claim 13, wherein the beam of electromagnetic radiation is in a terahertz (THz) range having a photon wavelength of from about 0.1 mm to about 1 mm and energy of from about 0.001 eV to about 0.01 eV.

15. The tunable optic device of claim 14 that is a THz circular dichroism (TCD) spectroscopy device having a region to hold a sample to be analyzed disposed between the tunable kirigami-based grating and a detector.

16. The tunable optic device of claim 13, wherein the tunable kirigami-based grating is a first tunable kirigami-based grating and the tunable optic device further comprises a second tunable kirigami-based grating independently capable of being reversibly stretched.

17. The tunable optic device of claim 13 further comprising a source of electromagnetic radiation directed at the tunable kirigami-based grating and a detector downstream of the tunable kirigami-based grating.

18. The tunable optic device of claim 13, wherein the plasmonic material is selected from the group consisting of gold (Au), alloys of gold (Au), silver (Ag), alloys of silver (Ag), copper (Cu), alloys of copper (Cu), aluminum (Al) and alloys of aluminum (Al), cadmium tellurium (CdTe), indium tin oxide (ITO), tungsten trioxide ($WO_3$), molybdenum trioxide ($MoO_3$), graphene, carbon dots, carbon ribbons, and combinations thereof.

19. The tunable optic device of claim 13, wherein the tunable kirigami-based grating exhibits a polarization rotation angle ($\theta$) of greater than or equal to about 75° after greater than or equal to about 10,000 cycles of stretching and relaxation.

20. The tunable optic device of claim 13, wherein the tunable kirigami-based grating exhibits an elliptical angle ($\eta$) of polarization of greater than or equal to about 30°.

* * * * *